US011429846B2

(12) United States Patent
Siddiqui

(10) Patent No.: US 11,429,846 B2
(45) Date of Patent: Aug. 30, 2022

(54) SYSTEMS AND METHODS FOR DECISION MODELLING OF A TEMPORAL PATH

(71) Applicant: KLIQ.CA INC., Mississauga (CA)

(72) Inventor: Kashif Siddiqui, Mississauga (CA)

(73) Assignee: KLIQ.CA Inc., Mississauga (CA)

( * ) Notice: Subject to any disclaimer, the term of this patent is extended or adjusted under 35 U.S.C. 154(b) by 871 days.

(21) Appl. No.: 16/254,533

(22) Filed: Jan. 22, 2019

(65) Prior Publication Data

US 2019/0228288 A1 Jul. 25, 2019

Related U.S. Application Data

(60) Provisional application No. 62/620,071, filed on Jan. 22, 2018.

(51) Int. Cl.
| | |
|---|---|
| *G06N 3/04* | (2006.01) |
| *G06N 3/08* | (2006.01) |
| *G06N 5/00* | (2006.01) |
| *G06Q 50/20* | (2012.01) |
| *G06Q 10/04* | (2012.01) |
| *G06N 5/04* | (2006.01) |
| *G06N 20/20* | (2019.01) |
| *G06Q 10/10* | (2012.01) |

(52) U.S. Cl.
CPC ............ *G06N 3/049* (2013.01); *G06N 3/08* (2013.01); *G06N 3/084* (2013.01); *G06N 5/003* (2013.01); *G06N 5/046* (2013.01); *G06N 20/20* (2019.01); *G06Q 10/04* (2013.01); *G06Q 10/105* (2013.01); *G06Q 50/20* (2013.01)

(58) Field of Classification Search
CPC ............ G06N 3/04; G06N 3/08; G06N 3/084; G06N 5/003
See application file for complete search history.

(56) References Cited

U.S. PATENT DOCUMENTS

| 5,073,867 A | 12/1991 | Murphy et al. | |
|---|---|---|---|
| 9,443,002 B1 * | 9/2016 | Freese | G06F 16/285 |
| 2015/0248739 A1 * | 9/2015 | Schulman | G09B 7/02 |
| | | | 705/327 |

(Continued)

FOREIGN PATENT DOCUMENTS

EP 0560595 9/1993

OTHER PUBLICATIONS

Patel, Bharat, Varun Kakuste, and Magdalini Eirinaki. "CaPaR: a career path recommendation framework." 2017 IEEE Third International Conference on Big Data Computing Service and Applications (BigDataService). IEEE, 2017. (Year: 2017).*

(Continued)

*Primary Examiner* — Hal Schnee

(57) ABSTRACT

A platform that integrates and collates the data points from students, employers, schools, and industry into an ecosystem which allows for customers (students, employers, schools, and industry) to model 'what-if' scenarios based on their industry parameters. By using a design algorithm based on automated reasoning, game theory, and knowledge mining, within a neural network, the platform can predict, model, and build the journey. The decision modeling neural learning platform may be used to augment or replace the need for guidance counselors in schools, along with assisting industry and immigration liaisons.

39 Claims, 9 Drawing Sheets

(56) References Cited

U.S. PATENT DOCUMENTS

| | | | | |
|---|---|---|---|---|
| 2016/0232625 A1* | 8/2016 | Akutagawa | ............. | H04L 51/14 |
| 2016/0275636 A1* | 9/2016 | Olenick | ............. | G06F 3/04842 |
| 2018/0039946 A1* | 2/2018 | Bolte | ................ | G06Q 50/2057 |
| 2018/0232751 A1* | 8/2018 | Terhark | ................. | G06N 7/005 |
| 2019/0034883 A1* | 1/2019 | Liang | ................ | G06Q 10/1053 |
| 2019/0130281 A1* | 5/2019 | Yang | ........................ | G06N 5/02 |

OTHER PUBLICATIONS

Bañeres Besora, David, and Jordi Conesa Caralt. "A life-long learning recommender system to promote employability." (2017). (Year: 2017).*

A Complete Tutorial on Tree Based Modeling from Scratch (in R & Python); https://www.analyticsvidhya.com/blog/2016/04/complete-tutorial-tree-based-modeling-scratch-in-python; Apr. 12, 2016; Analytics Vidhya Content Team.

Quick-R: Tree-Based Models; https://www.statmethods.net/advstats/cart.html; 2017, Robert I. Kabacoff.

Eight to Late; A Gentle Introduction to decision trees using R; https://eight2late.wordpress.com/2016/02/16/a-gentle-introduction-to-decision-trees-using-r/; Feb. 16, 2016; Kailash Awati and Sensanalytics Consulting Pty Ltd.

* cited by examiner

SYSTEMS AND METHODS FOR DECISION MODELLING OF A TEMPORAL PATH

CROSS-REFERENCE

This application claims the benefit of priority to United States Provisional Patent Application No. 62/620,071 filed Jan. 22, 2018 and entitled DECISION MODELING SINGULARITY DESIGN, the contents of which are herein incorporated by reference into the DETAILED DESCRIPTION OF EXAMPLE EMBODIMENTS herein below.

TECHNICAL FIELD

Example embodiments generally relate to journey mapping using a neural network.

BACKGROUND

In some journey decisions which involve a temporal path and journey outcome, such as for careers and education, the particular decision can be reliant upon guidance counselors, general statistics, single use cases, and/or general anecdotes. However, this may be an inefficient and even incorrect way of mapping a particular journey and may overlook certain subsets of options.

Some existing systems may be available to make such journey decisions. A difficulty with some such systems is that the use can be fairly restrictive and inflexible, or may merely provide general statistics or be based on specific rules.

SUMMARY

As part of any journey mapping or use case mapping, customers today can perform 'what-if' analysis against a certain set of current state parameters, which help them identify various possible outcomes. A primary gap with this type of analysis is that customers are unable to see 'inception to benefits realization'.

An example embodiment is a platform that uses designs and algorithms which allows student, parents, schools, and employers, the ability to segment, model, educate, and employ, based on the various changing parameters.

These design and algorithms allow students to model their grades and personalities against various career options. Students who know their career options can then segment, model, and design their educational journey with statistical correlations (e.g., R-Values) against probability of success and employability.

An example embodiment of a system for decision modelling of a personal temporal path comprises an interface system for receiving external data, at least one memory, and a processing system. The processing system is in communication with the interface system and the at least one memory, and configured to execute computer code stored on the at least one memory to; define more than one network layers of a temporal path neural network, at least two of the network layers representing different temporal events at different times in the personal temporal path, receive the external data from the interface system that includes at least one economic temporal event which corresponds to at least one of the network layers, train the temporal path neural network with the received external data, receive personal data of a user from the interface system that includes at least one user temporal event which corresponds to at least one of the network layers, determine a respective optimal temporal path within the temporal path neural network to at least one journey outcome for the user which corresponds to at least one of the network layers, from the at least one user temporal event which corresponds to at least one of the network layers, provide to the interface system at least one of the journey outcomes, the respective optimal temporal path, and information based on probabilistic attributes of the respective optimal temporal path, receive additional data from the interface system which corresponds to at least one of the network layers, re-determine a respective optimal temporal path within the temporal path neural network to at least one journey outcome for the user which corresponds to at least one of the network layers, using at least the additional data; and provide to the interface system at least one of the journey outcomes from the re-determining, and the respective optimal temporal path from the re-determining, and information based on probabilistic attributes of the respective optimal temporal path from the re-determining.

One example embodiment is a computer program product by a computer-implemented process for decision modelling of a personal temporal path, the computer program product comprising instructions stored in a non-transitory computer readable medium which, when executed by a computer, causes the computer to define more than one network layers of a temporal path neural network, at least two of the network layers representing different temporal events at different times in a personal temporal path. The computer may then receive external data from an interface system, the external data including at least one economic temporal event which corresponds to at least one of the network layers and train the temporal path neural network with the received external data. The computer further receives personal data of a user from the interface system that includes at least one user temporal event which corresponds to at least one of the network layers and determines a respective optimal temporal path within the temporal path neural network to at least one journey outcome for the user which corresponds to at least one of the network layers, from the at least one user temporal event which corresponds to at least one of the network layers. The computer then provides to the interface system at least one of the journey outcomes, the respective optimal temporal path, and information based on probabilistic attributes of the respective optimal temporal path. The computer can also receive additional data from the interface system which corresponds to at least one of the network layers, then re-determine a respective optimal temporal path within the temporal path neural network to at least one journey outcome for the user which corresponds to at least one of the network layers, using at least the additional data; and provide to the interface system at least one of the journey outcomes from the re-determining, and the respective optimal temporal path from the re-determining, and information based on probabilistic attributes of the respective optimal temporal path from the re-determining.

One example embodiment is a system for decision modelling of a personal temporal path, comprising an interface system for receiving external data, at least one memory, and a processing system. The processing system is in communication with the interface system and the at least one memory, and configured to execute computer code stored on the at least one memory to receive the external data from the interface system, train a machine learning system with the received external data, and receive personal data of a user from the interface system that includes at least one user temporal event comprising academic program information. The system also determines, using the trained machine learning system, a respective optimal temporal path to at least one career journey outcome for the user from the at least one user temporal event comprising the academic program information, and provides to the interface system at least one of the career journey outcomes and the respective optimal temporal path and information based on probabilistic attributes of the respective optimal temporal path. When the system receives additional data from the interface system, it re-determines a respective optimal temporal path to the at least one career journey outcome for the user, using at least the additional data; and provides to the interface system the at least one career journey outcome from the re-determining, and the respective optimal temporal path from the re-determining, and information based on probabilistic attributes of the respective optimal temporal path from the re-determining.

One example embodiment is a system for decision modelling of a personal temporal path, comprising an interface system for receiving external data, at least one memory, and a processing system. The processing system is in communication with the interface system and the at least one memory, configured to execute computer code stored on the at least one memory to receive the external data from the interface system that includes at least one economic temporal event, train a machine learning system with the received external data. When the system receives personal data of a user from the interface system that includes at least one user temporal event comprising academic program information, and a request that includes an identification of a career journey outcome that is desired for the user, the system determines, using the trained machine learning system, a respective optimal temporal path to the identified career journey outcome and provides to the interface system the identified career journey outcome and the respective optimal temporal path and information based on probabilistic attributes of the respective optimal temporal path. The system may receive additional data from the interface system, re-determine a respective optimal temporal path to the identified career journey outcome for the user, using at least the additional data, and provide to the interface system the identified career journey outcome from the re-determining, and the respective optimal temporal path from the re-determining, and information based on probabilistic attributes of the respective optimal temporal path from the re-determining.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF EXAMPLE EMBODIMENTS

Figure 1A:
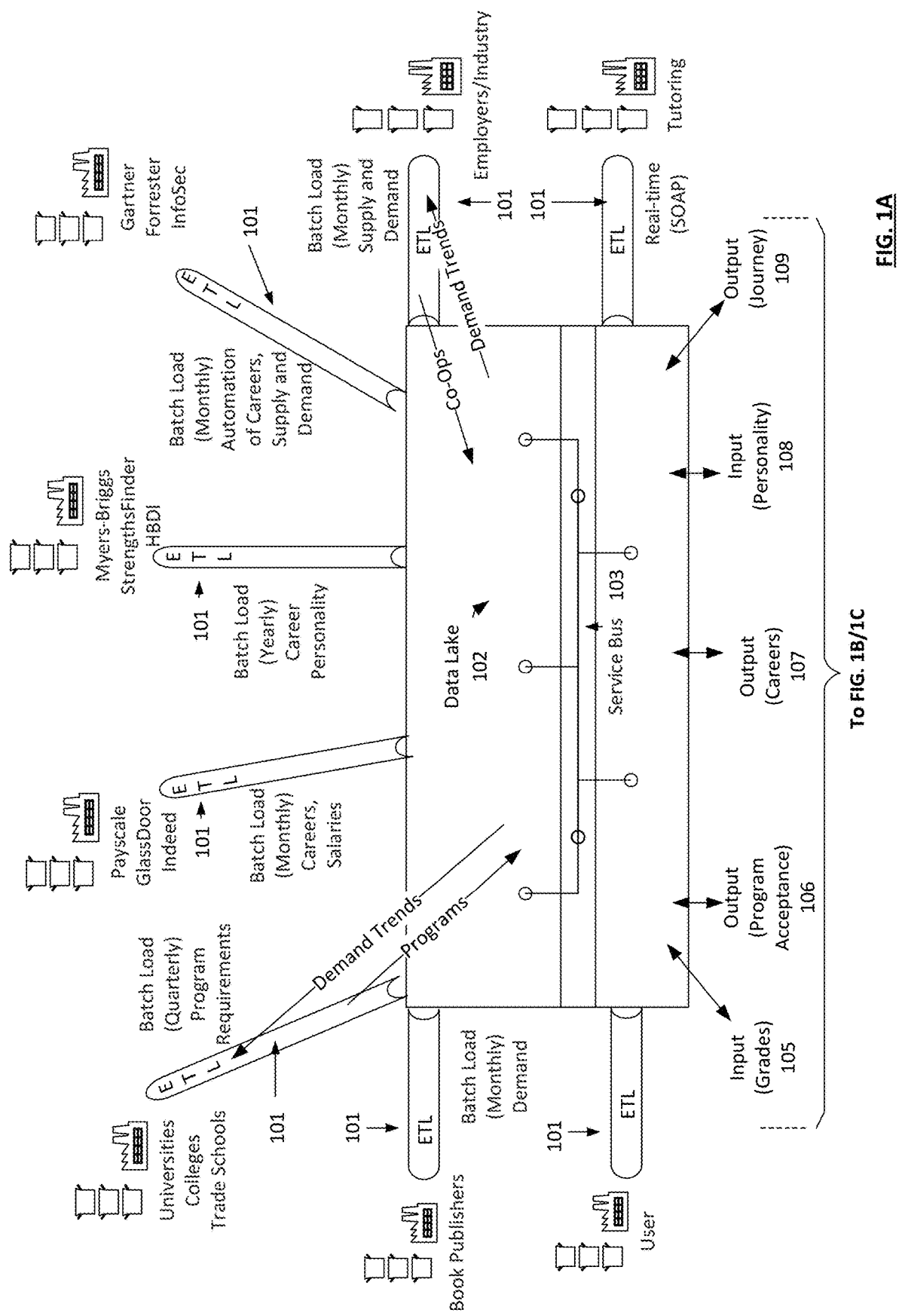
FIG. 1A illustrates a data portion of a decision modelling system, in accordance with an example embodiment.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium. Elements referred to in the singular may be implemented in the plural and vice versa, except where indicated otherwise either explicitly or inherently by context.

A neural network consists of a multitude of massively, sometimes completely, interconnected processing elements. The interconnection of these processing elements may be structured, but this is not a necessary requirement for these arrangements to be referred to as neural networks. The processing elements can be organized into layers, columns, trees, rings, stars etc. dependent on the problem to be solved and the available resources. All processing elements in a neural network need not be identical. This feature allows processing element configurations to be specialized to perform some specific functions within the network, such as input or output functions. Conventional neural networks are formed from processing elements which deal with boolean signals and are generally structured in layers.

Signals in a neural network can represent the states of devices in a process control systems network and any other signals or values which are operated on by neural networks and expert systems. A neural network consists of several layers, but typically neural networks contain; an input layer, which may include plural input nodes, an output layer, which may include plural output nodes and depending on the complexity of the problem being solved order to solve complex problems the typical neural network usually includes one or more in-between layers (sometimes referred to as hidden layers) between the input and output layers. In some instances, the layers between the input and output layers may further be restricted, confining the neural network to a range of possible outcomes or a range of pathways that are in accordance with the restrictions. There can be more than in between layer in a neural network. Each of the in-between layers may further consist of yet further layers of nodes and processing elements. Additional in-between layers increase processing in the network, but can clarify the outcome produced by the network. Conventional neural network processing is simply based on taking the inner product of a weight vector and the input vector and testing this value against some threshold. In some existing neural networks, the system itself assigns and adjusts the weights in order to correctly correlate input and output using a training algorithm and a training data set.

An example embodiment of a system for decision modelling of a personal temporal path comprises an interface system for receiving external data, at least one memory, and a processing system. The processing system is in communication with the interface system and the at least one memory, and configured to execute computer code stored on the at least one memory to; define more than one network layers of a temporal path neural network, at least two of the network layers representing different temporal events at different times in the personal temporal path, receive the external data from the interface system that includes at least one economic temporal event which corresponds to at least one of the network layers, train the temporal path neural network with the received external data, receive personal data of a user from the interface system that includes at least one user temporal event which corresponds to at least one of the network layers, determine a respective optimal temporal path within the temporal path neural network to at least one journey outcome for the user which corresponds to at least one of the network layers, from the at least one user temporal event which corresponds to at least one of the network layers, provide to the interface system at least one of the journey outcomes, the respective optimal temporal path, and information based on probabilistic attributes of the respective optimal temporal path, receive additional data from the interface system which corresponds to at least one of the network layers, re-determine a respective optimal temporal path within the temporal path neural network to at least one journey outcome for the user which corresponds to at least one of the network layers, using at least the additional data; and provide to the interface system at least one of the journey outcomes from the re-determining, and the respective optimal temporal path from the re-determining, and information based on probabilistic attributes of the respective optimal temporal path from the re-determining.

One example embodiment is a computer program product by a computer-implemented process for decision modelling of a personal temporal path, the computer program product comprising instructions stored in a non-transitory computer readable medium which, when executed by a computer, causes the computer to define more than one network layers of a temporal path neural network, at least two of the network layers representing different temporal events at different times in a personal temporal path. The computer may then receive external data from an interface system, the external data including at least one economic temporal event which corresponds to at least one of the network layers and train the temporal path neural network with the received external data. The computer further receives personal data of a user from the interface system that includes at least one user temporal event which corresponds to at least one of the network layers and determines a respective optimal temporal path within the temporal path neural network to at least one journey outcome for the user which corresponds to at least one of the network layers, from the at least one user temporal event which corresponds to at least one of the network layers. The computer then provides to the interface system at least one of the journey outcomes, the respective optimal temporal path, and information based on probabilistic attributes of the respective optimal temporal path. The computer can also receive additional data from the interface system which corresponds to at least one of the network layers, then re-determine a respective optimal temporal path within the temporal path neural network to at least one journey outcome for the user which corresponds to at least one of the network layers, using at least the additional data; and provide to the interface system at least one of the journey outcomes from the re-determining, and the respective optimal temporal path from the re-determining, and information based on probabilistic attributes of the respective optimal temporal path from the re-determining.

One example embodiment is a system for decision modelling of a personal temporal path, comprising an interface system for receiving external data, at least one memory, and a processing system. The processing system is in communication with the interface system and the at least one memory, and configured to execute computer code stored on the at least one memory to receive the external data from the interface system, train a machine learning system with the received external data, and receive personal data of a user from the interface system that includes at least one user temporal event comprising academic program information. The system also determines, using the trained machine learning system, a respective optimal temporal path to at least one career journey outcome for the user from the at least one user temporal event comprising the academic program information, and provides to the interface system at least one of the career journey outcomes and the respective optimal temporal path and information based on probabilistic attributes of the respective optimal temporal path. When the system receives additional data from the interface system, it re-determines a respective optimal temporal path to the at least one career journey outcome for the user, using at least the additional data; and provides to the interface system the at least one career journey outcome from the re-determining, and the respective optimal temporal path from the re-determining, and information based on probabilistic attributes of the respective optimal temporal path from the re-determining.

One example embodiment is a system for decision modelling of a personal temporal path, comprising an interface system for receiving external data, at least one memory, and a processing system. The processing system is in communication with the interface system and the at least one memory, configured to execute computer code stored on the at least one memory to receive the external data from the interface system that includes at least one economic temporal event, train a machine learning system with the received external data. When the system receives personal data of a user from the interface system that includes at least one user temporal event comprising academic program information, and a request that includes an identification of a career journey outcome that is desired for the user, the system determines, using the trained machine learning system, a respective optimal temporal path to the identified career journey outcome and provides to the interface system the identified career journey outcome and the respective optimal temporal path and information based on probabilistic attributes of the respective optimal temporal path. The system may receive additional data from the interface system, re-determine a respective optimal temporal path to the identified career journey outcome for the user, using at least the additional data, and provide to the interface system the identified career journey outcome from the re-determining, and the respective optimal temporal path from the re-determining, and information based on probabilistic attributes of the respective optimal temporal path from the re-determining.

Figure 1B:
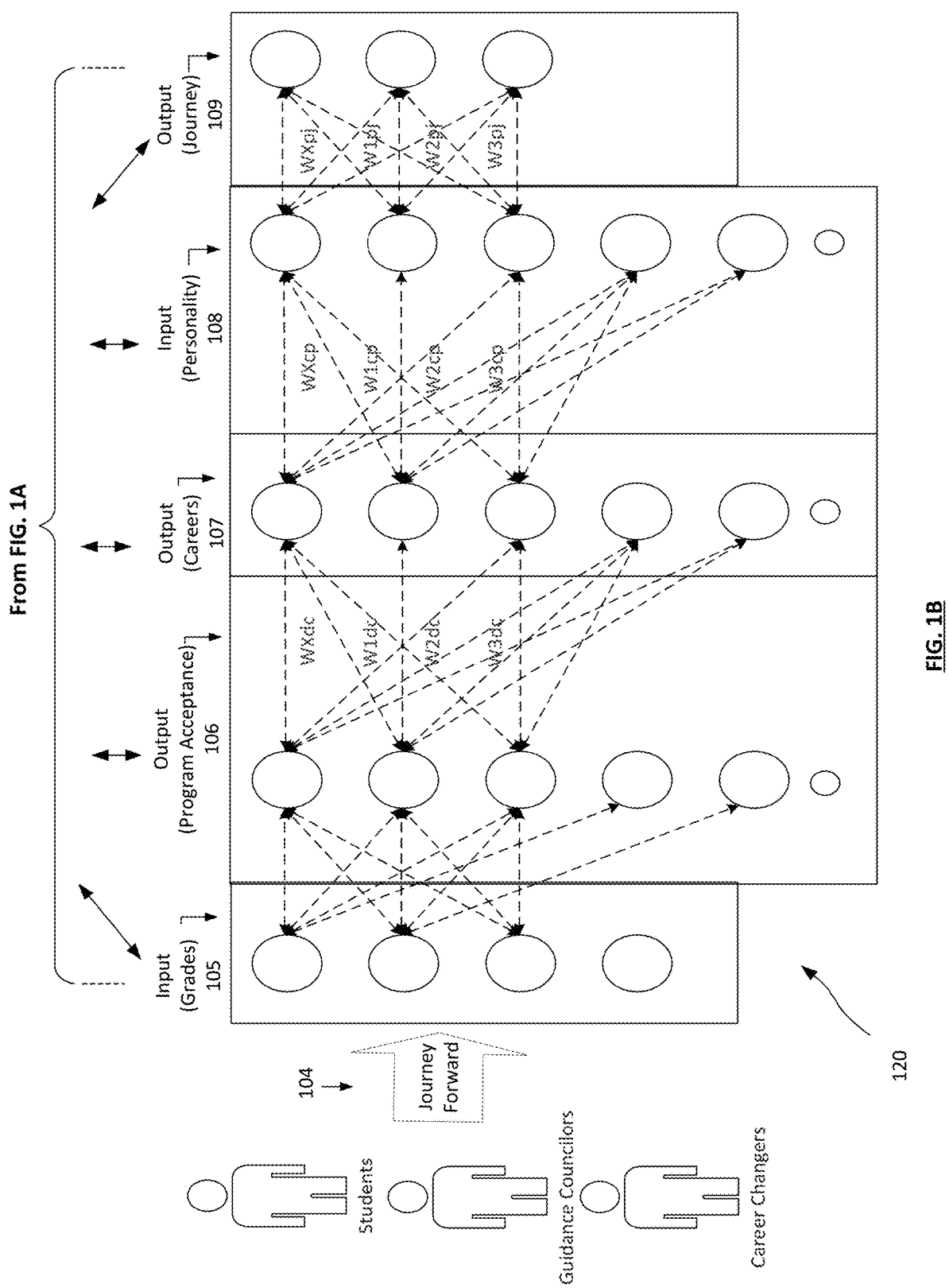
FIG. 1B illustrates a journey map temporal neural network portion of a decision modelling system, in accordance with an example embodiment.
Figure 1C:
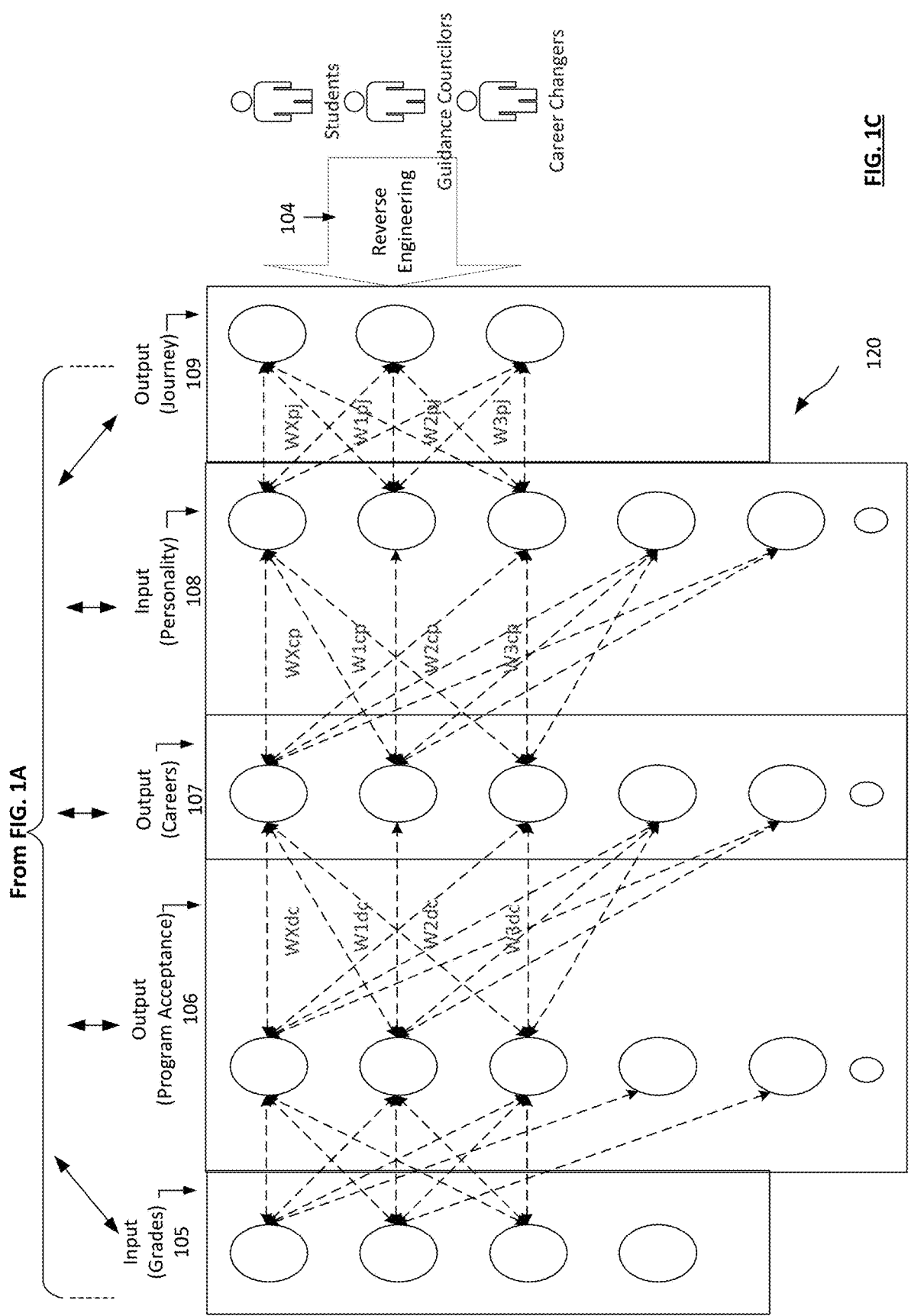
FIG. 1C illustrates a reverse engineering temporal neural network portion of a decision modelling system, in accordance with an example embodiment.

FIGS. 1A, 1B and 1C collectively illustrate a system for decision modelling of a temporal path using a neural network configured for temporal paths, in accordance with an example embodiment.

A temporal path neural network is defined by the system, as shown in FIGS. 1A, 1B and 1C. The temporal path neural network can be used to determine an optimal temporal path which includes a journey outcome, for example for a career journey outcome. A temporal path can be defined using neural network layers (referred to as network layers), each layer representing temporal event(s) or fact(s). At least some of the temporal events can be temporally separate in time. In other words, the various inputs, which may include temporal fact(s)/event(s) such as grades, personality, desired journey outcome, etc, and/or outputs of at least some fact(s)/event(s), which may include program, optimal temporal path, may take place at different times. The input(s) and output(s) can be a projected data or actual data, in example embodiments. In an example embodiment, the neural network is a feed forward and/or feedback neural network. In an example embodiment, the layers of the neural network are in a sequential order or chronological order. In some instances, the different temporal events may be entered (received by the system) at different times, and in response the system uses the temporal path neural network to re-determine an optimal temporal path to at least one journey outcome for the user which corresponds to at least one of the network layers from the at least one user temporal event which corresponds to at least one of the network layers. Some layers of the neural network can include non-temporal information, such as personality information.

Referring now to FIG. 1A which illustrates a data portion of a decision modelling system (also referred to as a system), the data portion of a decision modelling system may comprise of interface(s) 101 connecting external data source(s) to data lake(s) 102. The interface(s) 101, collectively referred to as an interface system or integration layer, receive external data from the external data sources. Service bus 103 connects the data lake 102 to a temporal path neural network 120 (not shown). The neural network shown in FIG. 1B is an example embodiment of a temporal neural network 120, which may has more than one network layers connected to the data lake 120. In example embodiments, the system may be configured to have network layers representing non-temporal user information and temporal event user information, with the non-temporal information being fixed over time.

Referring again to FIG. 1A, in an example embodiment, the temporal path neural network is configured to have temporal event layers or fields: Input: Grades 105, Output: Program Acceptance 106, Output: Careers 107, and Output: Journey 109, and non-temporal user information Input: Personality 108. In the example above, within the more than one network layers of the temporal path neural network, at least two of the network layers (Input: Grades 105 precede in time the question of whether a user was accepted into a program in Output: Program Acceptance 106) represent different temporal events at different times in a user temporal path.

The more than one network layers of the temporal neural network 120 are connected to the service bus 103 (shown by the arrows pointing to the bottom of the page in respect of elements 105, 106, 107, 108, 109).

Interface(s) 101 are interfaces developed to plug-in to the data repositories on one side and data lake 102 on the other side (collectively referred to as the interface system or integration layer). In the example embodiment, the interfaces plug into sites of Publishers, Schools, Employers, Coaching and other services. Personal data of a user may also be received from the interface system, the personal data including at least one user temporal event which corresponds to at least one of the network layers. In example embodiments, at least one user temporal event from the received personal data corresponds to at least one of the network layers, and is comprised at least one of: high school grades, post-secondary grades, post-secondary program entry, post-secondary course selection, credentials, or job attainment.

In one example embodiment, users may also be connected directly to the data lake 102 as external data via an interface 101. In other example embodiments, the user may be connected via an interface 101 to provide personal data to the temporal neural network 120, such that the user data is not provided directly to the data lake 102. However, the temporal neural network 120 may store provided user data to the data lake 102, for example via the service bus 103.

In some example embodiments, the data lake 102, temporal neural network 120, interface system and service bus 103 may collectively be located within a server. The server may further comprise a processing system and at least one memory. The at least one memory can store the personal and external data in the data lake 102, the computer code required to execute and or operate the interfaces 101, temporal neural network 120, and service bus 103. The at least one memory can be any kind of digital storage in some examples. The processing system is in communication with the interface system and the at least one memory, and configured to execute computer code stored on the at least one memory. External data received by the interface system is stored in the at least one memory by the processing system. The server(s) can be configured to tag or metatag data in the data lake 102. For example, the data pushed to the data lake 102 from the devices via the interfaces 101 can include raw untagged data, in an example embodiment. The one or more servers can be configured to push data including input nodes, output nodes, specific paths/journeys, and/or weight information to the data lake 102.

In example embodiments, interface(s) 101 use either ETL (Extract, Transfer, Load), simple object access protocol (SOAP), or representational state transfer (REST) designs, or the like to input and output data within these environments, as understood in the art. Interface(s) 101 may restrict read/write/access to the data lake, maintaining the privacy of customer data while also allowing partners to draw meaningful conclusions from same. As shown in FIG. 1A, example devices that can access the interfaces 101 include servers/devices for book publishers with privileges to input data with respect to general prices etc.; servers/devices for universities, colleges, trade schools which may include privileges to read/write; servers/devices for Payscale™, GlassDoor™, Indeed™ which may only have access to provide information about information about salary, benefits and compensation; servers/devices for personality services such as Myers-Briggs™, StrengthsFinder™, HBDI™; servers/devices for information security services such as Gartner™, Forrester™, InfoSec™; servers/devices for employers/industry; and servers/devices for tutoring services (tutors).

In the example embodiment of FIG. 1A, the interfaces all utilize an ETL system to connect to data lake 102. ETL (extract, transform, load) is a type of data integration that refers to the three step process (extract, transform, load) to unify and cleanse data from multiple sources. ETL is often used to build a data warehouse but for the present purposes it is used to build a data lake and a temporal neural network. During the ETL process, external data is taken (extracted) from the external data sources connected to the interface(s) 101, where it is converted (transformed) into a format that can be analyzed, and stored (loaded) into at least one memory that stores the data lake 102. For example, in FIG. 1A the data lake 102 is populated via the ETL process from a variety of external sources via the interface(s) 101, the external data sources including broadly speaking information from economic temporal events including educational, employment, or economic environments. In example embodiments, the processing system is configured to retrieve external data in by providing the interface system queries for information, monitoring the interface system for responses to the queries from the external databases, and storing in at least one memory the responses to the queries from the at least one external database.

Educational environments include any and all traditional schooling institutions, such as high schools, universities, colleges, etc. Employment environments include potential employers such as private sector employers, public sector employers, employees and so forth. Economic environments may include organizations that are responsible for predicting demand such as industry organizations. In one example embodiment, the external data comprises at least one of: career salary information, personality information, career demand information, credential information or alumni information.

In addition to retrieving information from the external data sources, ETL can be used to push information to the temporal neural network 120. In some example embodiments, ETL may be used to push information to via the interfaces 101 back to the external data sources. The interfaces 101 may also provide third parties such as third party service providers, data producers and data consumers with the ability to pull reports created by the decision modelling of a temporal path system which can help them understand actionable recommendation based on the correlations between their data points, and with those in their ecosystem. As an example, a school can retrieve a report from the data lake 102 using interface 101 and then publish their data points on program requirements, programs, and graduation rates. An employer can retrieve a report from the data lake and then publish data on careers in demand.

In one example embodiment, using the interfaces 101, external data is pushed to a data lake 102 by the third party service providers, wherein the processing system may be configured to sort the external data and position these data points into the temporal path neural network 120. Reports are generated by the processing system based on weights of the temporal neural network, and the reports are then pushed to the data lake 102. From there, a device/server of the school can be configured to pull reports from the data lake showing the correlation between their programs and careers from industry. Employers can pull reports from the data lake showing the rise of students who are entering the school system in certain programs, and this will cause a downstream influx of graduates in a certain field. Reference to "programs" can refer to academic programs. The reports can include data of the input layers and associated outcomes of the output layers.

The reports are generated by the system based on the weights of the temporal neural network 120. As discussed previously, the weights within the temporal path neural network can be determined by the temporal path neural network itself using an algorithm applied to a set of training data. In an example embodiment, the temporal neural network 120 is trained with the stored external data. The temporal path neural network 120 can also be trained with at least some of the data stored in the data lake 102, which data was received by data lake 102 via interfaces 101 from the external data sources. In example embodiments, the temporal neural network 120 is trained with the data stored in data lake 102 continuously, updating each time data lake 102 receives external data. In some example embodiments, the temporal path neural network is re-trained after receiving any new or further external data or personal data, or at some interval related thereto. Temporal path neural network 120 may be trained with the data stored in data lake 102 according to a time based interval, a data based threshold, an administration requested retraining, or the like.

In an example embodiment the system can determine metadata reports on the reports in the data lake 102. Devices of the system, including third parties, can receive or generate demand trends based on data and/or reports contained in the data lake 102. This design can foster a symbiotic data lake which will allow devices of the system via interface 101 to not only push key data points to the data lake 102 but to also pull data points from the data lake 102. Accordingly, two-way data flow, metatagging, correlations and reports is provided by the data lake 102 and the temporal neural network 120. For example, as shown in FIG. 1A, the servers/devices for universities, colleges, trade schools can push programs information to the data lake 102, and the programs can include prerequisites or required course information, for example. For example, as shown in FIG. 1A, the servers/devices for employers/industry can push co-ops information to the data lake 102, and the co-ops information can include prerequisites or required program, for example.

In one example, economists can use the system to pull real time reports from the data lake identifying which industries will see more demand, constraints, and gaps. This can help economic planners who plan cities and build partnerships with employers.

In example embodiments, data lake 102 is a data lake that is configured to cache received external data in the at least one memory. Data lake 102 can also allow the processing system of the system to manipulate (including both pushing and pulling) the external data between the repository and the temporal neural network 120 via the service bus 103. Similarly data lake 102 can also allow the processing system of the system to manipulate the external data between the repository (which may be stored in the at least one memory) and interfaces 101.

Data can be pushed to the data lake 102 by the devices/servers, or pulled from the devices/servers by the data lake 102. In an example embodiment, such data can be obtained in a batch load on a specified interval, such as monthly, quarterly, yearly, etc. In an example embodiment, such data can be obtained in real-time as information becomes available.

Service bus 103 shown in FIG. 1A is itself the interface between the data lake 102 and the temporal path neural network 120. The service bus facilitates both pushing and pulling all data. In some example embodiments, the temporal path neural network 120 will push data received from a user directly to the data lake 102 via the service bus 103.

Fields 104, 105, 106, 107, 108, 109 can be executed by one or more servers. Fields 104, 105, 106, 107, 108, 109 can each represent a layer of the temporal path neural network 120, and can be in a sequential order along the temporal path neural network 120. Fields 104, 105, 106, 107, 108, 109 can be executed as one or more individual temporal path neural networks, which may be joined together, in example embodiments.

FIGS. 1B and 1C show a journey map temporal neural network portion of a decision modelling system and a reverse engineering temporal path neural network, respectively, which networks may be the same temporal path neural network. Fields 104, show the processes for a journey map and a reverse engineering map, where the at least one journey outcome (for example a career journey outcome) is determined using the trained temporal path neural network based on the personal data provided by the user. In one example embodiment, the system requires personal data of a user in order to determine a respective temporal path (which may be an optimal path) within the temporal path neural network. In some example embodiments, the system utilizes user interfaces, such as interfaces 101, in order to receive same. In an example embodiment, the user interface may connect to the internet and connect the user to the interface via a browser application that allows a user device to input personal data, which data is sent to the system via the interface.

The system is configured to provide to the interface system at least one of the journey outcomes and the respective optimal temporal paths determined.

In the example embodiment in FIG. 1B, temporal path neural network 120 comprises of fields or layers as shown in FIG. 1A, shown as 105 (shown as Input: Grades), 106 (shown as Output: Program Acceptance), 107 (shown as Output: Careers), and 109 (shown as Output: Journey), and non-temporal event fields 108 (the non-temporal user information may comprise personality information of the user. shown as Input: Personality).

Field 105 in an example embodiment denotes a layer of the temporal path neural network 120 where personal data is received (either from a user (or authorized representative)). In an example embodiment, personal data comprises certifications, or credential information and/or trade skills. In some example embodiments, the personal data can be entered into the data lake and pulled through to the temporal path neural network via the processing system. In example embodiments, the interface system directly provides the personal data to field layer 104. In some example embodiments, the personal data received in field 105 (such as grades) are input once, and the system determines the at least one journey outcome and related temporal paths (optimal or otherwise). In other example embodiments the personal data received in field 105 may be entered multiple times, and the processing system may be configured to re-determine the at least one journey outcome and the temporal path with every additional personal data input by the user.

In the example embodiment, in field 106, a list of temporal events that may follow the temporal events in the personal data received is provided to the interface by the system, which is received by the user. For example, in a career environment, the interface system may be provided a list of programs that are capable of acceptance based on personal data. The user will receive data that is output from the system via the interface system. The outputs can be based on particular weightings scores determined within the temporal path neural network, by the processing system, from the personal data (e.g. grades) of the user, entered at Field 105.

In an example embodiment, the weighing scores are based on previous user personal data and external (third party) data that is used to train the temporal path neural network. The weighing scores can also be based on particular defined rules, for example some programs have mandatory courses or minimum grades. In some example embodiments, the system further determines the likely courses that a user should take to reach the at least one journey outcome. For example, the system may output or otherwise provide through the interface system that the user should take a "machine learning class" in a computer programming field, which may increase the user's likelihood to have the at least one journey outcome.

In some example embodiments, the field 106 may change depending on whether further temporal events are provided. For example, where the system at a future time from the receiving of the personal data, receives additional personal data of the user that includes an additional user temporal event which corresponds to at least one of the network layers (such as where a user enters first semester high-school grades are entered, and subsequently second semester high school grades ingress into the system), the system may be configured to re-determine the corresponding output field (the available programs).

In field 107, the temporal path neural network may be used to receive or output data. In the example shown, which relates to a career journey, the system outputs to the interface system, and therefore the user receives, a list of career(s) aligned to the accepted programs (also referred to as a journey outcome). The granularity of the output of the system may be set by an administrator, or be determined by the system. For example, the system may output a career as broad as engineer. In some example embodiments, the system may output a more granular determination such as "biomedical engineer." As will be discussed in greater detail below, the system may also output a probability of success and/or a confidence value.

In some example embodiments, the field 107 may change depending on whether further temporal events are provided. For example, where the system at a future time from the receiving of the personal data, receives additional personal data of the user that includes an additional user temporal event which corresponds to at least one of the network layers (such as where a user enters high-school grades, and subsequently enters university grades in the system), the system may be configured to re-determine the respective optimal temporal path within the temporal path neural network to the at least one journey outcome from the additional user temporal event which corresponds to at least one of the network layers and from the at least one user temporal event which corresponds to at least one of the network layers.

In some example embodiments, the system provides the interface system, and therefore outputs to the user, with an optimal journey outcome based on a probability of success, confidence value or threshold.

A probability of success metric is determined by the processor using the trained temporal path neural network and represents the trained temporal path neural network's estimation that the temporal path for the user will be successful in achieving the at least one journey outcomes. The value of the probability of success metric may be relation to the user personal and the external data. For example, in the career context, where the user has grades which are input that are in a lower percentile of acceptance into a program with a strong track record of graduates going on the only chiropractic school, the system may determine that based on the personal data there is only a 54% chance (if the determined temporal path is followed) for the user to become a chiropractor as the temporal event of the user is unlikely to meet the program requirements. In some example embodiments, the system outputs a range as a probability of success. With reference to the previous example, the system may output that the temporal path of the user is between 50-60% likely to lead to becoming a chiropractor and take the determined temporal path. In some example embodiments, the system may output different probabilities of success respective to the plurality of journey outcomes shown, or respective to the various levels of granularity provided through the interface system to the user. For example, in system may output a distinct likelihood of becoming a marketer generally, as well as a brand specialist, and a social media specialist.

Field 108: This field or layer of the temporal path neural network may be used to receive or output data. In the example shown, which relates to a career journey, the user can enter their personality types through the interface system. The personality type may be a type selected from a drop down menu, or the personality type may be related to services such as Myers-Briggs™, StrengthsFinder™, HBDI™. In some example embodiments, every instance of the system receiving personal data from the user requires the user to input a personality type which is used by the temporal path neural network to determine a temporal path and at least one journey outcome. In some embodiments, the system only requires receiving from the user a personality type once, and the system assumes that the value is non-temporal. Various combinations where the system incorporates new personality data are possible.

Field 109: This field or layer of the temporal path neural network may be used to receive or output data. In the example shown, which relates to a career journey, the system provides the journey map(s) to the career(s), which are received by the user on their device. The journey map may include a series of journey outcomes and a series of temporal paths determined to lead to the journey outcomes. The journey output may comprise at least one journey outcome and the respective optimal temporal paths. In an example embodiment, at least one of the journey outcomes is a career, and wherein at least one of the network layers corresponds to academic program information. In one example embodiment, the at least one journey outcome having the determined respective optimal temporal path is an optimal journey outcome; and the system provides same to the interface system. For example, a student may have stellar grades in the maths and sciences, and a career in computer programming may be the highest earning and least expensive career to pursue.

In an example embodiments, the system is used to determine using the temporal path neural network more than one temporal path to each at least one journey outcome which are above a specified threshold. For example, in one embodiment the system may provide careers to the user's devices that do not require graduate school, as the personal data and trained neural network indicate that a long duration before making income is not preferred. In example embodiments, the system is configured to determine the respective optimal temporal path based on least one of: probability of success or a confidence value. The threshold described above may be a threshold comprised at least one of a probability of success or a confidence value of the at least one journey outcome.

In some example embodiments, the system provides the interface system the respective at least one of the probability of success values or the confidence value associated with the provided at least one journey outcome.

In example embodiments, the system further provides the interface system at least one of the journey outcomes, the respective optimal temporal path, and information based on probabilistic attributes of the respective optimal temporal path. Probabilistic attributes may comprises the calculated weights of the temporal path neural network from the at least one journey outcomes to the respective temporal paths (optimal or otherwise).

In some example embodiments, the system further provide to the interface system at least one of the journey outcomes from a re-determining (based on additional data), and the respective optimal temporal path from the re-determining, and information based on probabilistic attributes of the respective optimal temporal path from the re-determining.

In some example embodiments, the processing system is configured to determine the respective optimal temporal path of at least one journey outcome based on least one of: a future salary, cost, duration, or scholarship information.

Each of the fields discussed above could represent different phases of a journey depending on the context of the problem and the available data. In example embodiments, the temporal path neural network will not use personality type to determine a career, and field 108 will not be necessary.

Each of the fields discussed above may also be implemented as a single node in a neural network, a plurality of nodes, or as a plurality of layers themselves containing a plurality of nodes.

In one example embodiment, the more than one network layers of the temporal path neural network defined by the processing system, as shown in FIG. 1B, are in a sequential order in a feed forward direction of the temporal path neural network.

Weights of the neural network(s) can be determined by the server(s), using their processors (which processors or processing system may form part of the earlier referred to processing system), either in real time or offline. The processors assigns and adjusts the weights, and subsequently uses a training algorithm or training data set to correctly correlate input and output. In some example embodiments, the training data is the external data. In example embodiments where the system is re-trained, the processing system is configured to use the external data and any personal data inputted by the user to re-train the system. In other example embodiments, a combination of the external data and the user inputs are combined to determine the weights. For example, the system may receive at a future time additional personal data (data in addition to the personal data already received) through the interface system that includes at least one additional user temporal event representing an actual outcome and re-train the temporal path neural network with the stored external data, the at least one user temporal event, and the at least one additional user temporal event.

In some example embodiments, for the journey forward, users can input their temporal event parameters (e.g., Field 105 and Field 108) via the user interface 104, which are received by the system. In some example embodiments, the personal data which contains the temporal data may be input into the system by a guidance counselor, career changer, parent, or other person authorized by the student to do so.

Referring now to FIG. 1C, in some embodiments, the system can reverse engineer and request one journey outcome that is desired for the user, e.g. Outputs (e.g., Field 109 and/or Field 107) and the system will provide the user the respective optimal temporal path of the identified one journey outcome. For example, the system may receive a personal data or a request that includes an identification of one journey outcome that is desired for the user. The system would then determine a respective optimal temporal path within the temporal path neural network to the one journey outcome for the user which corresponds to at least one of the network layers from the at least one user temporal event which corresponds to at least one of the network layers and provide same to the user via the interface system.

In some example embodiments, the system is configured to receive additional data from the interface system which corresponds to at least one of the network layers, and then re-determine a respective optimal temporal path within the temporal path neural network to at least one journey outcome for the user which corresponds to at least one of the network layers, using at least the additional data. In the example embodiment, the system provides to the interface system at least one of the journey outcomes from the re-determining, and the respective optimal temporal path from the re-determining, and information based on probabilistic attributes of the respective optimal temporal path from the re-determining.

In one example embodiment the system is configured such that re-determining a respective optimal temporal path to at least one journey outcome using at least the additional data comprises self-optimizing the temporal path based on forward-propagated and backward-propagated learned or new data ingress or egress through the interface system.

In the example embodiment, the system may further be configured to determine whether user has requested to store additional data, and in response to determining user requested to store additional data, store the additional data on the at least one memory.

In some example embodiments, example input nodes or layers are in Field 105 and Field 108. Example output nodes or layers are in Field 106, Field 107, and Field 109. Any of the output layers of Field 106, Field 107, and Field 109 can alternatively be defined as outcome layers. In other words, they are actuals or calculated outcomes, or can be used as inputs of actual or desired outcomes. For the neural network, in an example embodiment, the layers can be in chronological or sequential or irregular order.

Figure 2A:
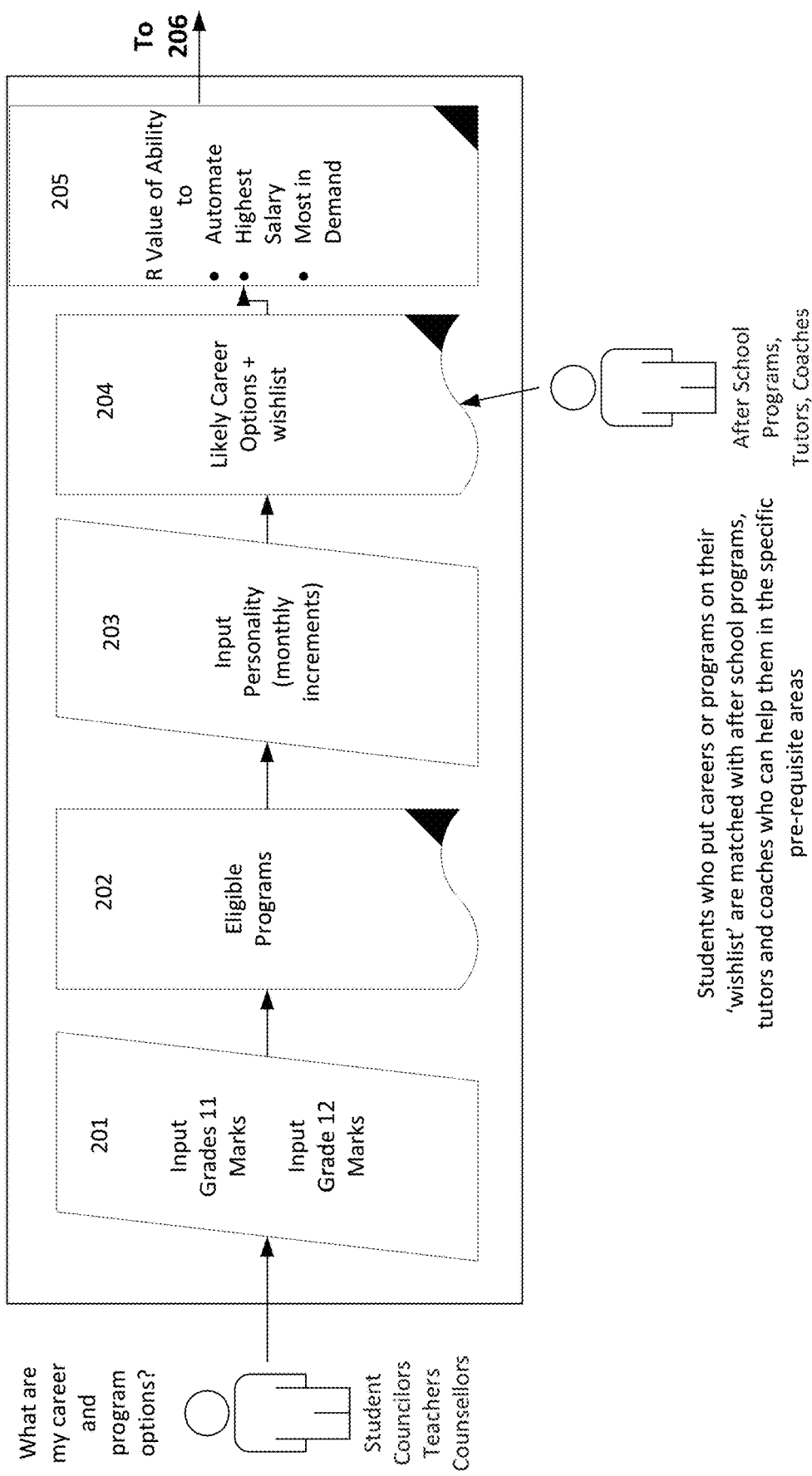
FIG. 2A illustrates an first portion of an example journey map process, for a career journey, in accordance with an example embodiment.
Figure 2B:
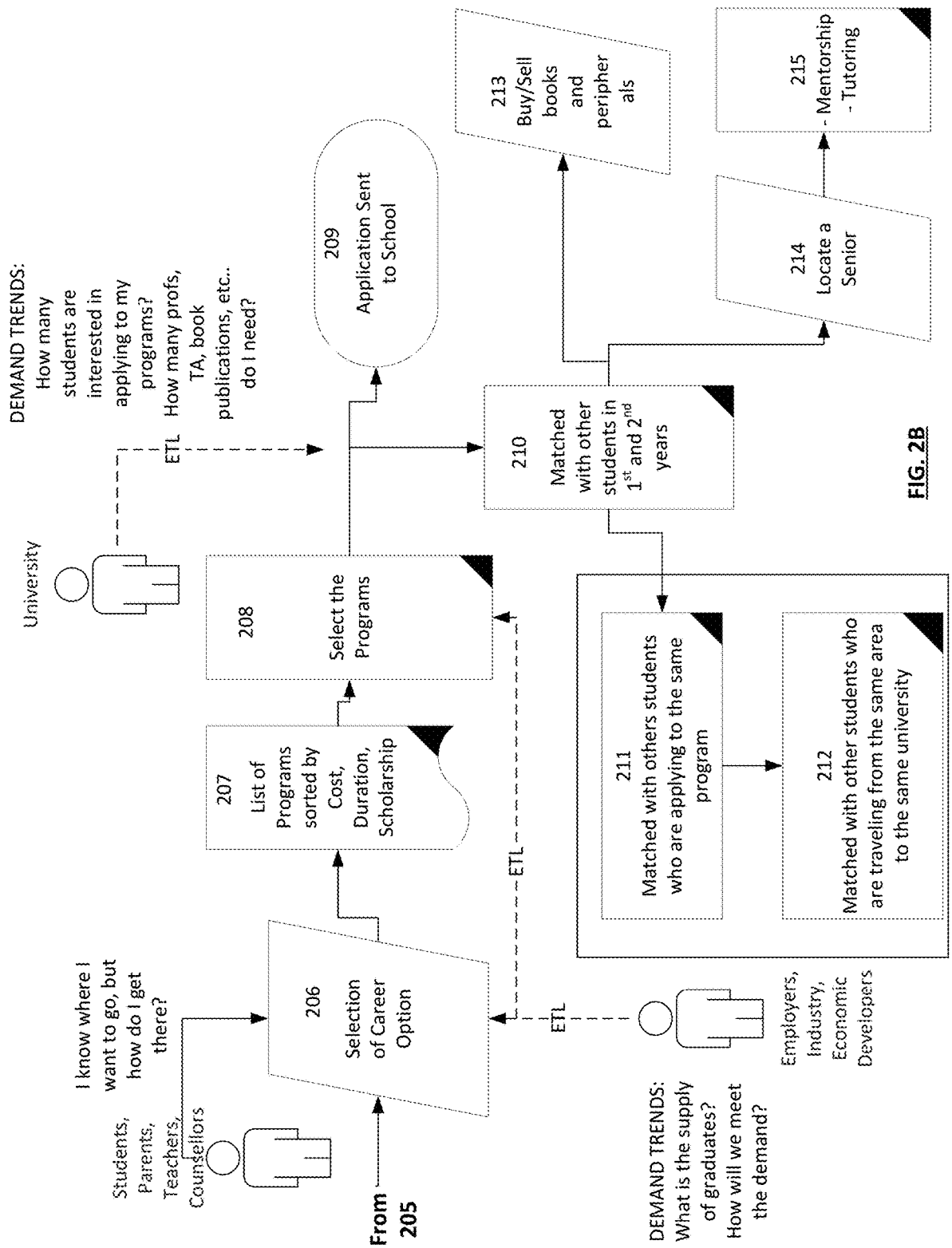
FIG. 2B illustrates an second portion of an example journey map process, for a career journey, in accordance with an example embodiment.

In some example embodiments outputs are dynamically updated whether the use case is from the career journey (FIG. 1B) or reverse engineering (FIG. 2B). For example, for career journey (Field 104) if the user is accepted to their program (output), the remaining downstream fields (career choices, Field 107) are updated. In some example embodiments, the system may be configured to only update the journey from the new fixed temporal input. Using the example above, where a user is accepted into the program, the system may start the determinations to start from program acceptance, without taking into account the users high school grades. In some example embodiments, the system uses all available temporal events for the user to re-determine a respective optimal temporal path and at least one journey outcome.

Similarly, in the reverse engineering example, if additional personal data including user temporal events is received, the system re-determines the optimal temporal path. For example, if a user is accepted into a program which is not an optimal path for medical school, the system may recommend that the user consider a masters program to have a better change of getting into medical school. In some example embodiments, a desired journey outcome that is received through the interface system by user input may be different than the first journey outcome selected using Field 104, and the upstream choices (e.g. program choice, Field 106) are updated.

The system may be configured to self-optimize any temporal path (optimal or otherwise) based on updating the temporal path neural network by either re-training the network or re-determining the temporal paths. The temporal path neural network can be re-trained and the determination recalculated using forward-propagation and backward-propagation to, or the re-training or determination can be based on or triggered by new data ingress or egress through the interface system/integration layer.

In one example embodiment, the system allow users to store additional data attributes over a time lapsed journey, the additional data provided by the system via an interface connected to a user device and allowing for the user to input data, which data is conveyed to the system via the interface, to further allow the neural network to learn, recommend, or augment optimal temporal paths.

In some example embodiments, the system may have fewer or greater amounts of input layers. In the given example regarding careers, system may require a personal data of a temporal event at every stage of the journey. This can be output to the user by way of a user prompt. For example, the system may request or require a possible program to be selected from a list determined by the system, and subsequently select from a list of journey outcomes (e.g. career outcomes) that pass from the selection, after which the system will provide the interface an optimal path.

The finally determined optimal temporal path (e.g. a career path which can be represented by Field 109) or a journey outcome (e.g. a career outcome, which can be represented by Field 107) can be provided to an interface system, output to a display screen connected to the system, and/or transmitted to a device of the user via an interface connected to the internet allowing for user access through a browser for example. In one example embodiment, the user is required to utilize a dedicated application in order to access information from the interface via the system.

As can be seen in FIGS. 1B and 1C, one or more of the input layers, such as input parameters 108, are not necessarily defined in the first 'n' layers of the neural network, but rather can be defined after one or more of the output layers, such as Field 106 and Field 107.

In example embodiments, the system further utilizes elastic databases to store data and/or in data lake 102. The elastic database uses thresholds which trigger horizontal scaling and parallel processing in a more dynamic manner that a traditional monolithic design. In example embodiments, elastic databases are used to store related data between careers and programs. In some example embodiments, career information and personality type information are stored in an elastic database, allowing for faster and more efficient processing of correlational data from the various external data sources.

FIGS. 2A and 2B illustrate an example journey map process for a career journey from a user's perspective, in accordance with an example embodiment. FIGS. 2A and 2B show a journey map process were the neural network has already been trained with the external data.

In step 201, user personal data, such as grade 11 or grade 12 marks are entered. The personal data, which contains a temporal event, can be input through field 105, an interface 101, or field 104 as discussed above.

In step 202, users are provided with a list of subsequent temporal events. In the career example, the system lists eligible programs. The list of eligible programs will correspond to the output from field 106. In some example embodiments, the system will not provide the user with the ability to select programs, and will simply provide a journey outcome based on the provided grades.

In step 203, users may input additional personal data or non-temporal information, which is received by the system. In the example, personality information is received. The personality parameters may be provided in monthly or quarterly increments. In some example embodiments, the personality parameters are only provided once. The system may further be configured to assume that the personality of the user is constant in all periods of time. The personality parameters in the example embodiment corresponds to at least one of the network layers the input through Field 108.

In step 204, the system provides the interface system output to the user including likely journey outcomes (career options and/or a wishlist of careers). The output in step 204 in the example embodiment corresponds to at least one of the network layers from Field 107.

In step 205, based on the external data (e.g. data received from the third parties) and retrieved from the data lake 102, the temporal path neural network can be trained and the at least one journey outcomes (career options) presented in step 204 can be presented with a score/weighting. In an example embodiment, the system may determine that journey outcomes selected in step 204 are not optimal. The system can provide the interface system with optimal journey outcomes (career options) or the system can be configured to provide the interface system with reduced/refined journey outcomes.

In example embodiments, a probability of success, sometimes referred to as a statistically significant value (e.g., R value or correlation coefficient) can be provided to the interface system to assist in deciding amongst the journey outcomes (career options). The probability of success may be dependent a variety of external data factors, or conclusions drawn by the system from the external data. For example, the probability of success in a career journey may dependent on which of the careers may be automated, which have the highest demand, and/or which have the highest salary, by the time of graduation. The output in step 205 in the example embodiment can correspond to at least one of the network layers from Field 107.

In example embodiments, the user or user authorized representative provides, and therefore the system receives, personal data which includes after school activities and/or other extra-curricular activities. The system may be configured to utilize said personal data in determining the journey outcomes displayed.

In example embodiments, the user or user authorized representatives enter, and therefore the system receives, a journey outcome wish list, as shown in FIG. 2A.

Referring now to FIG. 2B, in step 206, which succeeds step 205 of FIG. 2A, a journey outcome (career choice) is selected. In example embodiments, the journey outcome options are provided alongside pertinent information to make the decision. The pertinent factors may be factors listed above used to determined probability of success. In example embodiments, the journey outcomes provided for selection are the journey outcomes with the highest probability of success. In example embodiments, the pertinent factors may include a confidence value, the confidence value being based on an error rate determined by the system for its calculations.

In some example embodiments, the system provides a choice of the respective optimal temporal path within the temporal path neural network to a plurality of journey outcomes for the user. In example embodiments, the system only outputs to the interface device (and to the user) the optimal path to the optimal journey outcome. In other example embodiments, the system outputs and provides the respective optimal temporal path within the temporal path neural network to a plurality of journey outcomes for the user above a threshold.

In step 207, the system provides to the interface system a list of programs which are required to at least one journey outcome for the user which corresponds to at least one of the network layers from the at least one user temporal event a temporal path, determined via the temporal path neural network. The list can be sorted by cost, duration, scholarships, and other factors. In example embodiments, the list may be configured to contain a specified amount of programs. In other example embodiments, the system is configured to allow for scrolling by a user through all available programs.

In step 208, a program is selected.

In step 209, in the example embodiment, application information corresponding to the required for the selected program is sent to the school.

In some example embodiments, the system has the ability to match a user with a further user who has an optimal temporal path or selected temporal path in a similar path. The system determines using the temporal path neural network, that the at least one memory contains a respective user profile of at least one further user having a respective further temporal path that matches one of the optimal temporal paths of the user. The system may be configured to determine that the further users respective temporal path is more chronologically or sequentially advanced in the temporal path than the user, and provide the user with contact information for the second user.

In an example embodiment, the system, upon finding a matching further user, may be configured to provide to the interface system the respective further temporal path of the at least one of the further users.

For example in a career journey, in step 210, junior students can be matched with 1st and 2nd year students who are already in the same selected program.

In one example embodiment, shown in step 211, junior students can be matched with senior students based on those applying to the same selected programs. The system may output the senior student's path.

In step 212 junior students are matched may further be matched with senior students based on those applying from the same geographic region.

In one example embodiment, shown in step 213, functionality can be provided for students to sell back books/school material to new students.

In steps 214, the system may locate a senior student for mentoring, tutoring, and support purposes, and link the two students together in step 215.

Figure 3A:
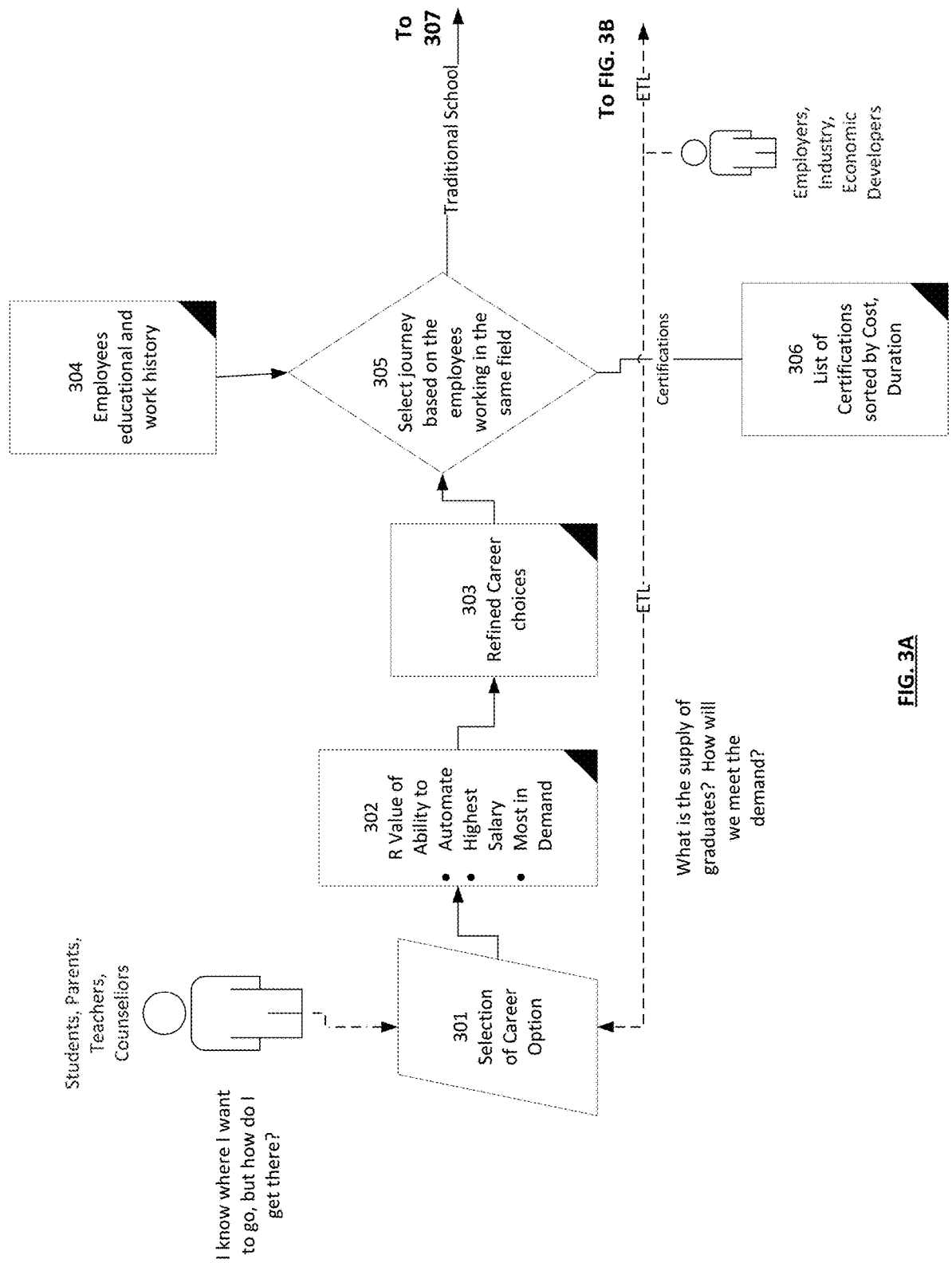
FIG. 3A illustrates a first portion of an example reverse engineering process, for a career journey, in accordance with an example embodiment.

FIG. 3A illustrates a reverse engineering process for a career journey, in accordance with an example embodiment. In the reverse engineering process the processing system is configured to receive a request that includes an identification of one journey outcome that is desired for the user, and providing to the interface system the respective optimal temporal path of the identified one journey outcome that is desired for the user that was determined within the temporal path neural network via a respective optimal temporal path to at least one journey outcome for the user which corresponds to at least one of the network layers from the at least one user temporal event which corresponds to at least one of the network layers.

In step 301 at least one journey outcome (career choice) is selected. The selected at least one journey outcome can be one of many presented journey outcomes, or there may be only one journey outcome presented. The journey outcomes output in step 301 in the example embodiment can correspond to at least one of the network layers from Field 107, which can then be selected.

In step 302, based on the external data (e.g. data received from the third parties) and retrieved from the data lake 102, the temporal path neural network can be trained and the at least one journey outcomes (career options) selected in step 301 can be presented with a score/weighting. A statistically significant value, a probability of success (e.g., R value or correlation coefficient) can be determined for which of the careers may be automated, which have the highest demand, and which have salary, by the time of graduation is presented with each career option, and which direction the career is trending in, which may be based on some or all of the above factors.

In example embodiments, the user or user authorized representative provides, and the system receives, personal data which includes after school activities and/or other extra-curricular activities. The system may be configured to utilize said personal data in determining the journey outcomes displayed.

In step 303, refined/reduced list of journey outcomes (career choices) are presented with consideration of the probability of success value (score/weighting/R value). In some example embodiments, the difference between the selected journey outcomes in step 301 and the presented journey outcomes in step 303 is a question of granularity. For example, in step 301, the user may select a career broadly defined as engineering through the interface device. The careers presented in step 303 may provide further granularity for career choices, for example the system may determine that biomedical engineering is favorable to industrial engineering, and recommend same. In another example, careers having lower scores may not be presented. The journey outcomes in output in step 302 in the example embodiment can correspond to at least one of the network layers from Field 107, which can then be selected.

In step 304, information (from the external data) on employees educational and work history in the selected journey outcome is collated. The collated data is pushed to the temporal path neural network, training the weights of the neural network based on the journey data (history) of existing employee data from third parties. The system determines the appropriate journey which can be output from the journey layer 109. The appropriate journey for the user can be determined using decision tree algorithms described herein, to determine either a best single journey (based on score/weight), or alternatively all of the valid applicable journeys and an associated total score or total weighting above a certain threshold for those journeys are presented, for example. In example embodiments, all of the applicable temporal paths are presented.

In step 305, the temporal path choices determined by the system in step 304 may be presented (e.g., this can be presented/sorted with additional data such as cost, duration), and the user can select which temporal path is desired. The temporal paths presented in step 305 in the example embodiment can correspond to at least one of the network layers from Field 107, which can then be selected.

In step 306 a list of educational avenues (certifications, trade skills) for the selected career choice are listed, if applicable. For example, some programming career outcomes may be more correlated to certifications as opposed to degrees, and the temporal path neural network may recommend focusing on same as opposed to "traditional school". This can be determined from Field 105 in some examples.

Figure 3B:
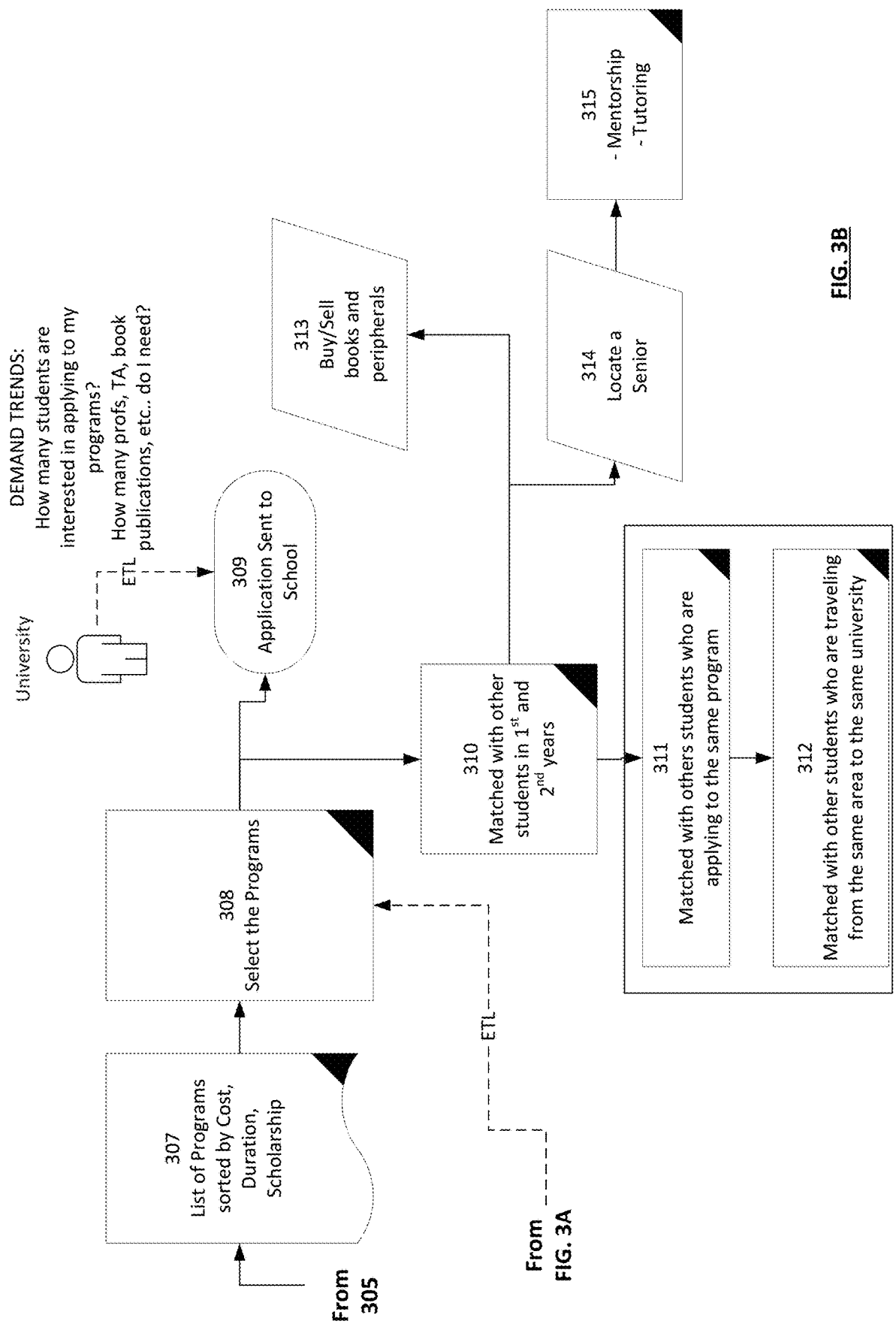
FIG. 3B illustrates a second portion of an example reverse engineering process, for a career journey, in accordance with an example embodiment.

In the example where the a selected temporal path (optimal or in some cases non-optimal) requires traditional schooling, in step 307, shown in FIG. 3B, follows step 305 and provides lists of programs which can be sorted by cost, duration, scholarships, are presented. The list of programs can be output from Field 107 and then selected from the choices. Step 307 may be implemented in a similar manner as to step 207.

Steps 308-315 may be implemented in a similar manner as steps 208-215. A basic outline is described below.

In step 308, a program is selected. In step 309, the selection may be sent to the school. In step 310, junior students may be matched with 1st and 2nd year students who are already in the same selected program. In step 311 junior students may be matched with Senior Students based on those applying to the same programs. In step 312, junior students may be matched with Senior Students based on those applying from the same geographic region.

In step 313, students may be able to sell back books/school material to new students. In steps 314 and 315, a senior may be located for mentoring, tutoring, and support.

In example embodiments, the described system and platform integrates and collates the data points from students, employers, schools, and industry into an ecosystem which allows for customers (students, employers, schools, and industry) to model 'what-if' scenarios based on their industry parameters. By using a design algorithm based on automated reasoning, game theory, and knowledge mining, within a temporal path neural network, the platform can predict, model, and build a career journey as a journey outcome. The decision modelling temporal path neural learning platform may be used to augment or replace the need for guidance counselors in schools, along with assisting industry and immigration liaisons.

In one example embodiment, the system can be used to help students find a mentor.

Figure 4:
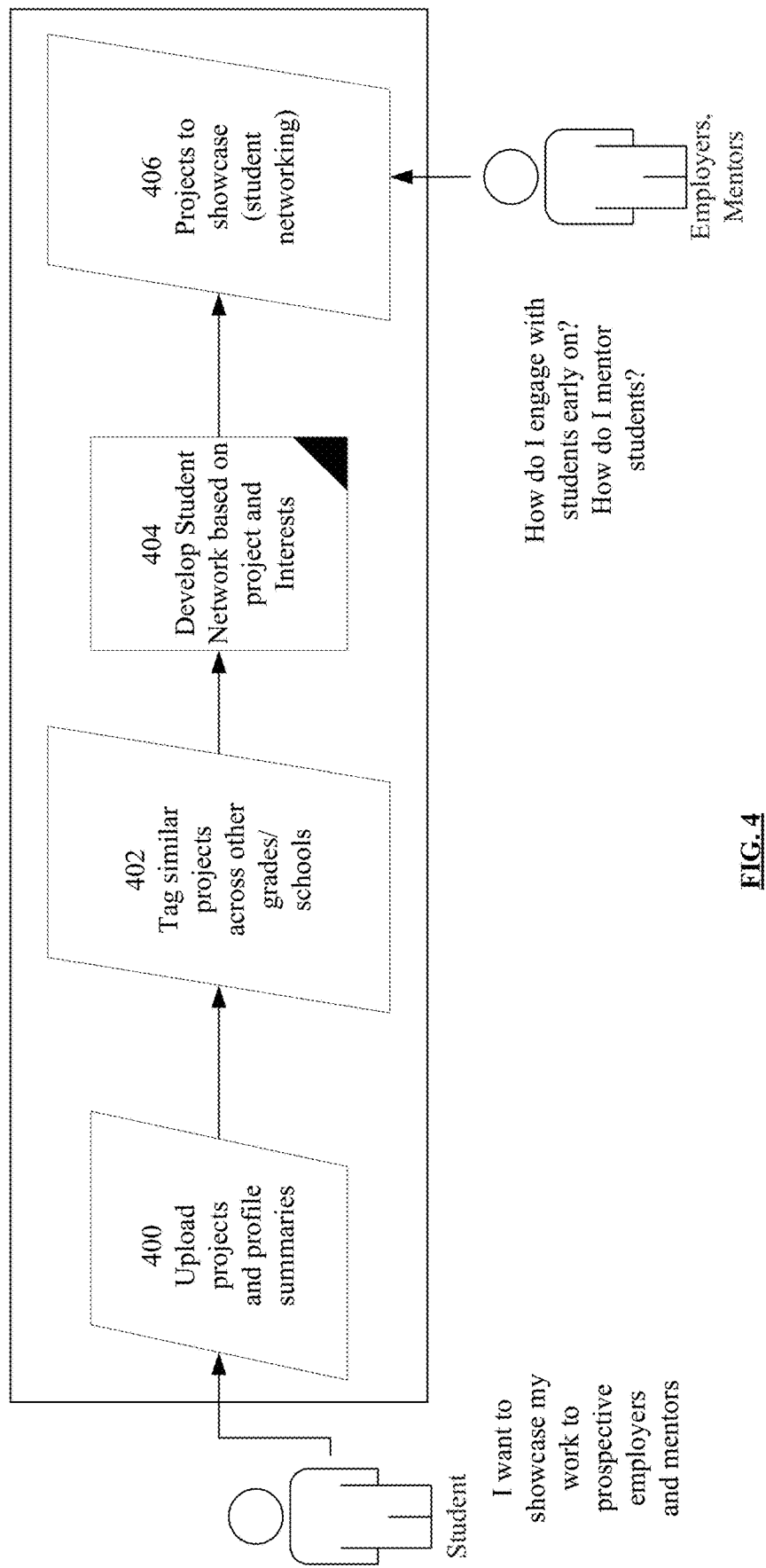
FIG. 4 illustrates an example mentorship journey map process, for a career journey, in accordance with an example embodiment.

FIG. 4 is an example mentorship journey map process, for a career journey, in accordance with an example embodiment.

In step 400, a user wants to get mentorship faster. The user uploads projects and profile summaries.

In step 402, the system matches the user with further users who have similar projects and profiles. The matching process may be independent of school, grade or distance in the temporal path. The matching process may involve determining an optimal temporal path via the temporal path neural network to at least one journey outcomes. The temporal paths and journey outcomes may be determined in part based on the information contained in the student projects and profiles.

In step 404, the system develops a student network based on the students with matching projects and profiles.

In step 406, the system matches the student with potential employers or mentors who have similar journey outcomes or temporal paths. In one example embodiment, the system matches the students with the employer or mentor who are in the most likely journey outcome based on the provided profiles and projects.

In on example embodiment, the system can also be used, in unison with additional data points, to track an athletic journey and receive specific coaching or mentorship based on a trajectory indicated by the temporal path neural network.

Figure 5:
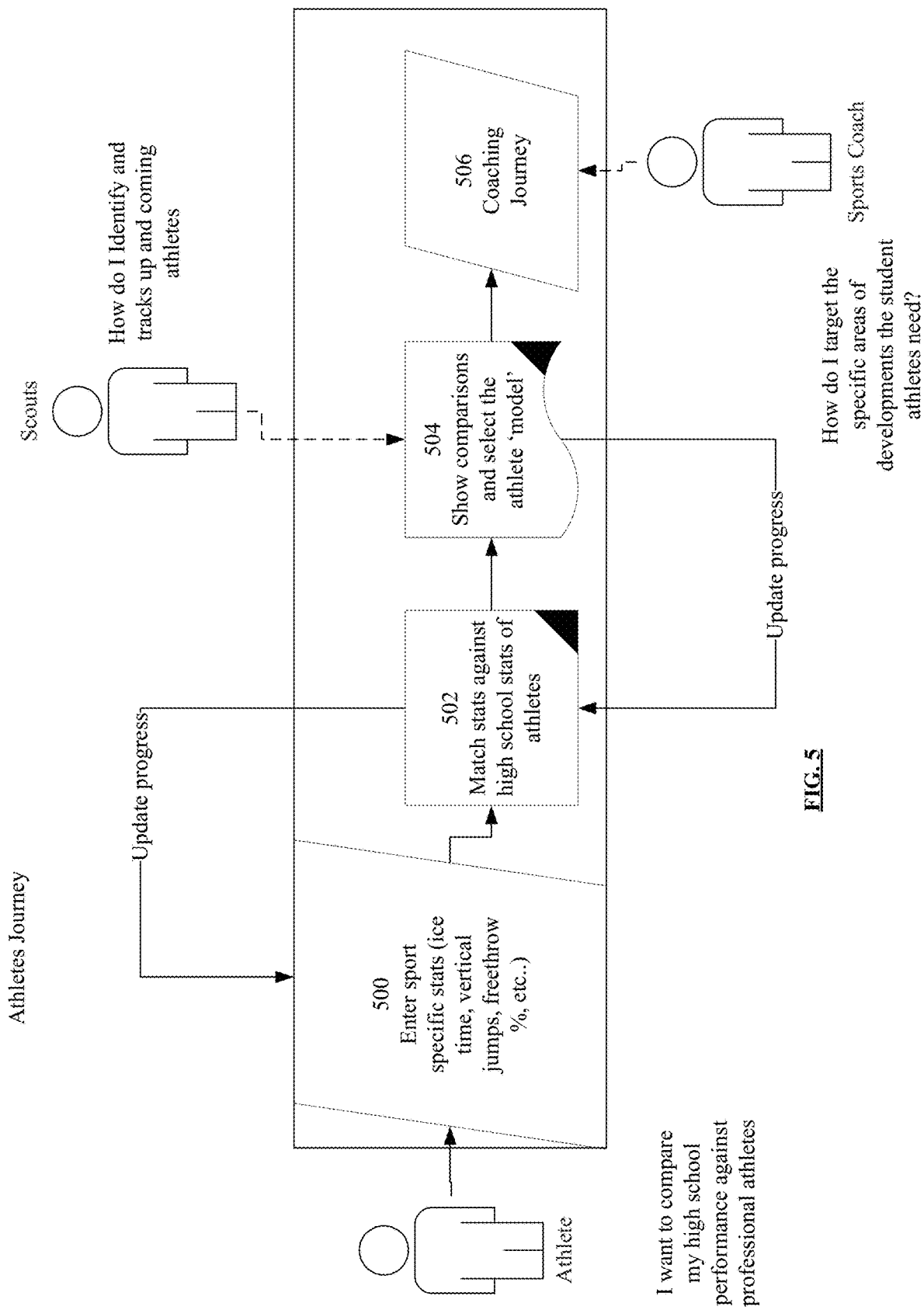
FIG. 5 illustrates an example athlete's journey map process, for a career journey, in accordance with an example embodiment.

Referring now to FIG. 5, at step 500, a user can input their temporal event (key parameters) based on the sport. As an example, for basketball it may be the number of 3 pointers, jump heights, or running times at a particular time; or for baseball it could pitch speeds, home runs, or catches, etc., for other sports.

Once users input their key parameters, at step 502 the system can perform a comparative analysis against professional players in the field. The matching can search for similar athletes in a similar temporal zone for the user, and display the similar athlete's temporal path allowing the user to set goals. In one example embodiment, a respective optimal temporal path within the temporal path neural network to at least one journey outcome is determined for the user which corresponds to at least one of the network layers from the at least one user temporal event which corresponds to at least one of the network layers. In one example embodiment, the system may recommend to the user to change sports based on the temporal events provided. The system may be able to help identify key improvement areas.

At step 504, the system provides the comparative analysis to the user. In example embodiment, the system provides scouts with the data. In some example embodiments, the system is configured to run a reverse engineering, wherein the user selects a desired journey outcome, and the system determines an optimal path.

At step 506, the system provides the user with contact information for coaches for the closest temporal path match. For example, in the beginning of a basketball players career, the user may need to work with a shooting coach to improve shooting performance. Over time, the system may recommend that the user focus on dribbling with a dribbling coach once the shooting performance has sufficiently improved.

As another example, the system can also be used to help foreign students match their foreign credentials and language skills to North American post-secondary school requirements. A student who is in China and interested in studying in North America can match their high school diploma to the recognized credentials per North American standards, along with course and language requirements. These students will be able to identify schools along with prospective employers who could sponsor and support these students through the educational and career journey. The system can also be used to connect and match with local establishments such as food, lodging, transportation, and cultural centers.

In implementing the temporal path neural network, the system may be configured to grow tree a decision tree (using one or decision tree, batch, classification tree, or a regression tree, a conditional inference tree or an ensemble method), examine the results, prune the decision tree, or use techniques such as random forests, and chi square. Below are additional technical specifications relative to the decision modelling platform illustrated in FIGS. 1A, 1B, 1C, 2A, 2B, 3, 4, and 5, for example using R-code in an example embodiment. This is adapted from Quick-R (statmethods-.net).

In the example embodiments, the temporal path neural network decision tree is grow or shortened depending on the external data and the number of layers implemented. This can in part be accomplished using a logistic regression formula (The typical use of this model is predicting y given a set of predictors x) to determine probabilistic natures of the outcomes of the trees.

In instances where the decision tree is required to be grown, the temporal path neural network may be grown using for example the RPART formula. The RPART formula is requires the following syntax: "rpart (formula, data=, method=, control=)," wherein formula is in the format, outcome~predictor1+predictor2+predictor3+etc.

An example R-code for growing neural network decision tree is rpart (having syntax (formula, data=, method=, control=)) where formula is in the format "outcome~predictor1+predictor2+predictor3+etc, "data" specifies the data frame, method requires a "class" for a classification tree, or "anova" for a regression tree, control defines the optional parameters for controlling tree growth. For example, control=rpart.control(minsplit=30, cp=0.001) requires that the minimum number of observations in a node be 30 before attempting a split and that a split must decrease the overall lack of fit by a factor of 0.001 (cost complexity factor) before being attempted.

The rpart algorithm works by splitting the dataset in a recursive fashion, and subsets that arise from a split are further split until a predetermined termination criterion (for example the "control" parameters listed above, is reached. The rpart algorithm attempts to achieve the splits that results in the results in the largest possible reduction in heterogeneity of the dependent variable based on changes to the independent variable.

In classification trees, referred to above in the rpart formula, the target variable can take a discrete set of values. In regression trees (denoted by "anova" above), the target variable can take continuous values.

Once the rpart algorithm has provided solutions, pertinent data is displayed to determine next steps. In one example embodiment, the following functions are used help to examine the results: printcp(fit), which displays a vomplexity parameter (cp) table, plotcp(fit), which plots cross-validation results, rsq.rpart(fit), which plots approximate R-squared and relative error for different splits (2 plots-labels should only be used with for the Analysis of Variance ("ANOVA") method discussed above), print(fit) which print results, summary(fit) which provides detailed results including surrogate splits, plot(fit), which plots the decision tree, and text(fit) which labels the decision tree plot, post(fit, file=) in order to create postscript plot of decision tree. It should be noted that in trees created by rpart( ), when the stated condition is true the branch moved to the left.

The next step is to prune back the decision tree to avoid overfitting the data. Typically, the system will select a tree size that minimizes the cross-validated error (the xerror column printed by printcp( )), in the previous step. Pruning the tree to the desired size can be accomplished using "prune(fit, cp=)" function. Comparing the printcp( ) output to examine the cross-validated error results, select the complexity parameter associated with minimum error, and place it into the prune( ) function.

In an alternative embodiment, the system can use the code fragment, fit$cptable[which.min(fit$cptable[,"xerror"]), "CP"] to automatically select the complexity parameter associated with the smallest cross-validated error.

As discussed above, the tree can be formed with a classification tree or a regression tree. In one example embodiment the system can be trained to predict a type of deformation (kyphosis) after surgery, from age in months (Age), number of vertebrae involved (Number), and the highest vertebrae operated on (Start). An example of the classification tree implemented in R is as follows, library (rpart) is used to grow the tree, the following parameters are selected as follows: rpart(Kyphosis~Age+Number+Start, method="class", data=kyphosis). printcp(fit) is used to display the results, plotcp(fit) is used visualize cross-validation results, and summary(fit) shows detailed summary of splits. The tree is then plotted using plot(fit, uniform=TRUE, main="Classification Tree for Kyphosis"), and text(fit, use.n=TRUE, all=TRUE, cex=0.8). A postscript plot of tree is created using post(fit, file="c:/tree.ps", title="Classification Tree for Kyphosis").

The tree is pruned with pfit<-prune(fit, cp=fit$cptable [which.min (fit$cptable[,"xerror"]),"CP"]), and subsequently the pruned tree is plotted with the plot function, plot(pfit, uniform=TRUE, main="Pruned Classification Tree for Kyphosis") and the text function, text(pfit, use.n=TRUE, all=TRUE, cex=0.8) and the post function post (pfit, file="c:/ptree.ps", title="Pruned Classification Tree for Kyphosis")

A regression tree example where cost is predicted from price, program, personality, and career is as follows (The data frame is cu.summary) the tree library is loaded with library(rpart), grown with the rpart function fit<-rpart(Cost~Price+Program+Personality+Career, method="anova", data=cu.summary), the results are plotted with printcp(fit) (display the results), plotcp(fit) (to visualize cross-validation results), summary(fit) (detailed summary of splits). Additional summary plots are created using the par(mfrow=c(1, 2)) (two plots on one page) function, the rsq.rpart(fit) (to further visualize cross-validation results)

The tree is plotted in a similar fashion, using the aforementioned plot function plot (fit, uniform=TRUE, main="Regression Tree for Cost") and text function (text(fit, use.n=TRUE, all=TRUE, cex=0.8)), and creating the attractive postcript plot of tree with post(fit, file="c:/tree2.ps", title="Regression Tree for Cost").

The tree is pruned with the prune function (pfit<-prune(fit, cp=0.01160389) using cptable)m and the pruned tree is plotted (plot(pfit, uniform=TRUE, main="Pruned Regression Tree for Cost"), text(pfit, use.n=TRUE, all=TRUE, cex=0.8), post(pfit, file="c:/ptree2.ps", title="Pruned Regression Tree for Cost")

The classification and regression tree in the example embodiments yield the same tree.

In example embodiments, the processing system determines the odds of a probability of event occurrence versus probability of not event occurrence. In one example embodiment, the odds are determined using the following formula: odds=p/(1−p)=probability of event occurrence/probability of not event occurrence ln(odds)=ln(p/(1−p))logit(p)=ln(p/(1−p))=WXdc+WXcp+WXpj . . . +WXyz.

In an alternative embodiment to using the rpart function, the decision tree can be modelled with a conditional inference tree (which can be implemented via a party package from Quick-R.) In the example embodiment, the party package provides nonparametric regression trees for nominal, ordinal, numeric, censored, and multivariate responses. In the example embodiment where the system is implemented in R, one can create a regression or classification tree via the function ctree which has the syntax (formula, data=). One of the advantages of using a conditional inference tree is that tree growth is based on statistical stopping rules, so pruning should not be required.

The type of tree created will depend on the outcome variable (nominal factor, ordered factor, numeric, etc.). Referring again to the kyphosis example above, a conditional inference tree can be implemented as follows: library (party) is used to call the party package, fit<-ctree(Kyphosis~Age+Number+Start, data=kyphosis) is used to generate the tree, after which it is plotted with plot(fit, main="Conditional Inference Tree for Kyphosis").

In the example embodiment with respect to cost, the implementation is as follows, library(party) is used to call the party package, fit2<-ctree(Cost~Price+Program+Personality+Career, data=na.omit(cu.summary)) is used to generate the tree.

In example embodiment, random forest techniques are used to improve predictive accuracy of the tree by generating a large number of bootstrapped trees (based on random samples of variables), classifying a case using each tree in this new "forest", and deciding a final predicted outcome by combining the results across all of the trees (an average in regression, a majority vote in classification). An example random forest approach implementation is via a random-Forest™ software package by Breiman and Cutler, as understood in the art.

An example implementation of the random forests technique in R is as follows in the aforementioned kyphosis example, library(randomForest) is used to call the random forest library, while fit<-randomForest(Kyphosis~Age+Number+Start, data=kyphosis) is used to implement the random forest technique. The results can be displayed using print(fit) and mportance(fit), where the importance( ) function shows the importance of each predictor.

In another example embodiment, the decision tree can be run through chi-square technique, as understood in the art. chi-square is an algorithm to find out the statistical significance between the differences between sub-nodes and a parent node. The difference is measured by taking a sum of squares of standardized differences between observed and expected frequencies of target variable.

The chi-square technique works with categorical target variables which have "Success" or "Failure" values. The chi-square technique can perform two or more splits, and the higher the value of chi-square the higher the statistical significance of differences between sub-node and parent node. Chi-square values of each node can be calculated using formula, Chi-square=((Actual−Expected)^2/Expected)^½.

Using chi-square to grow a tree generates tree commonly referred to as a CHAID (Chi-square Automatic Interaction Detector). The steps to calculate chi-square values for a split require calculating the chi-square value for individual nodes by calculating the deviation for Success and Failure both, and then calculating chi-square values of a split using the sum of all chi-square of success and Failure of each node of the split.

In the example embodiment related to selecting programs for users, in order to create tree splits with respect to different programs, first a node is populated for courses which can up to 10 unique codes. The node is populated with the actual value for "Program1" and "Program2." In the current example, the two actual values are 2 and 8 respectively. The calculated expected value for for "Program1" and "Program2" using chi-square would be 5 (given that the parent node has probability of 50% and we have applied same probability on courses count (10).

The deviations are then calculated by using formula, (Actual−Expected). In the example embodiment, "Program1" the deviation is −3 (2−5=−3), and for "Program2" the deviation is 3 (8−5=3).

The chi-square value of node for "Program1" and "Program2" is calculated using formula, ((Actual−Expected)^2/Expected)^½.

Similar steps are used to calculate the chi-square value for determining a male node. After the steps discussed above are completed, all the chi-square values for the male node are added to calculate a chi-square for splitting the a gender node.

In example embodiments, the likelihood of a certain probability occurring in the decision tree can be calculated with the following "odds" formula odds=p/(1−p)=probability of event occurrence/probability of not event occurrence, where the log of the likelihood ratio is ln(odds)=ln(p/(1−p)) logit(p)=ln(p/(1−p))=WXdc+WXcp+WXpj . . . +WXyz, where W means the weight assigned to the variable during the training of the temporal path neural network (also sometimes referred to as a log-likelihood probability).

This particular formula can be further explained below:

Logistic regression is used to find the probability of event=success and event=failure. Using logistic regression is preferable when the dependent variable is binary (0/1, True/False, Yes/No) in nature. Here the value of the independent variable ranges from 0 to 1 and it can represented by following equation odds=p/(1−p)=probability of event occurrence/probability of not event occurrence.

Where the function is being used in a binomial distribution (dependent variable), a logit function is a link function which is best suited for this distribution In the equation above, the parameters are chosen to maximize the likelihood of observing the sample values rather than minimizing the sum of squared errors (like in ordinary regression).

The use of logistic regression described above may be desirable because it is widely used for classification problems, and it doesn't require linear relationship between dependent and independent variables. logistic regression can handle various types of relationships because it applies a non-linear log transformation to the predicted odds ratio.

Logistic regression is also used to avoid over fitting and under fitting, if all significant variables are used. Step wise methods are sometimes used to estimate the logistic regression to ensure all significant variables are used. However, the chi-square technique may require large sample sizes because maximum likelihood estimates are less powerful at low sample sizes than ordinary least square. The efficiency of the chi-square technique may be increase if the independent variables are not correlated with each other (i.e. no multi collinearity). However, there are options to include interaction effects of categorical variables in the analysis and in the model.

In respect of nomenclature, if the value of dependent variable is ordinal, then it is called as ordinal logistic regression. If the dependent variable is multi-class then it is known as multinomial logistic regression.

There are two additional methods are part of the machine learning environment which are readily understood to those skilled in the art: 2) Ensemble Methods; 3) Unsupervised Learning.

In an example embodiment where the system utilizes machine learning, the processing system is configured to receive the external data and train a machine learning system with the received external data. The system then receives personal data of a user from the interface system, the personal data including at least one user temporal event comprising academic program information, and then the system determines, using the trained machine learning system, a respective optimal temporal path to at least one career journey outcome for the user from the at least one user temporal event comprising the academic program information. The system may be configured to provide to the interface system at least one of the career journey outcomes and the respective optimal temporal path and information based on probabilistic attributes of the respective optimal temporal path.

The system may also be configured to receive additional data from the interface system, and re-determine a respective optimal temporal path to the at least one career journey outcome for the user, using at least the additional data. The system may be father configured to provide to the interface system the at least one career journey outcome from the re-determining, and the respective optimal temporal path from the re-determining, and information based on probabilistic attributes of the respective optimal temporal path from the re-determining.

In the example embodiment wherein machine learning is used for reverse engineering, the system may be configured to receive the external data that includes at least one economic temporal event, train a machine learning system with the received external data. Upon receiving personal data of a user includes at least one user temporal event comprising academic program information and a request that includes an identification of a career journey outcome that is desired for the user, the system determines, using the trained machine learning system, a respective optimal temporal path to the identified career journey outcome. The system may provide to the interface system the identified career journey outcome and the respective optimal temporal path and information based on probabilistic attributes of the respective optimal temporal path.

In a further example embodiment, the system may receive additional data from the interface system, and re-determine a respective optimal temporal path to the identified career journey outcome for the user, using at least the additional data. The system may provide to the interface system the identified career journey outcome from the re-determining, and the respective optimal temporal path from the re-determining, and information based on probabilistic attributes of the respective optimal temporal path from the re-determining.

In accordance with an example embodiment, there is provided a non-transitory computer-readable medium containing instructions executable by a processor for performing any one of or all of the described methods. In accordance with an example embodiment, there is provided a processor-implemented method for performing any one of or all of the described functions described with respect to any of the processors.

In the described methods, the boxes/fields may represent events, steps, functions, processes, modules, state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

While some example embodiments have been described, at least in part, in terms of methods, a person of ordinary skill in the art will understand that some example embodiments are also directed to the various components for performing at least some of the aspects and features of the described processes, be it by way of hardware components, software or any combination of the two, or in any other manner. Moreover, some example embodiments are also directed to a pre-recorded storage device or other similar computer-readable medium including program instructions stored thereon for performing the processes described herein. The computer-readable medium includes any non-transient storage medium, such as RAM, ROM, flash memory, compact discs, USB sticks, DVDs, HD-DVDs, or any other such computer-readable memory devices.

It will be understood that the devices described herein include one or more processors and associated memory. The memory may include one or more application program, modules, or other programming constructs containing computer-executable instructions that, when executed by the one or more processors, implement the methods or processes described herein.

The coding of software for carrying out the above-described methods described is within the scope of a person of ordinary skill in the art having regard to the present disclosure. Machine readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

The term "processor" may comprise any programmable system comprising systems using micro- or nano-processors/controllers, reduced instruction set circuits (RISC), ASICs, logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object-oriented databases, and any other structured collection of records or data that is stored in a computer system. The above examples are example only, and thus are not intended to limit in any way the definition and/or meaning of the terms "processor" or "database".

An example embodiment of a system for decision modelling of a personal temporal path comprises an interface system for receiving external data, at least one memory, and a processing system. The processing system is in communication with the interface system and the at least one memory, and configured to execute computer code stored on the at least one memory to; define more than one network layers of a temporal path neural network, at least two of the network layers representing different temporal events at different times in the personal temporal path, receive the external data from the interface system that includes at least one economic temporal event which corresponds to at least one of the network layers, train the temporal path neural network with the received external data, receive personal data of a user from the interface system that includes at least one user temporal event which corresponds to at least one of the network layers, determine a respective optimal temporal path within the temporal path neural network to at least one journey outcome for the user which corresponds to at least one of the network layers, from the at least one user temporal event which corresponds to at least one of the network layers, provide to the interface system at least one of the journey outcomes, the respective optimal temporal path, and information based on probabilistic attributes of the respective optimal temporal path, receive additional data from the interface system which corresponds to at least one of the network layers, re-determine a respective optimal temporal path within the temporal path neural network to at least one journey outcome for the user which corresponds to at least one of the network layers, using at least the additional data; and provide to the interface system at least one of the journey outcomes from the re-determining, and the respective optimal temporal path from the re-determining, and information based on probabilistic attributes of the respective optimal temporal path from the re-determining.

In a further example embodiment of the system determining comprises determining the respective optimal temporal path within the temporal path neural network to a plurality of journey outcomes for the user.

In a further example embodiment of the system the processing system is further configured to receive a request that includes an identification of at least one journey outcome that is desired for the user, wherein the providing comprises providing the respective optimal temporal path of the identified one journey outcome that is desired for the user.

In a further example embodiment of the system, the more than one network layers of the temporal path neural network defined by the processing system are in a sequential order in a feed forward direction of the temporal path neural network.

In a further example embodiment of the system the received personal data includes non-temporal user information, wherein at least one network layer of the temporal path neural network represents the non-temporal user information. In one example embodiment, the non-temporal user information comprises personality information of the user.

In a further example embodiment of the system the at least one of the network layers of the temporal path neural network comprises hidden layers.

In a further example embodiment of the system the additional data is additional personal data of the user that includes an additional user temporal event which corresponds to at least one of the network layers.

In a further example embodiment of the system the processing system is further configured to determine using the temporal path neural network more than one temporal path to each at least one journey outcome which are above a specified threshold, and the providing comprises providing to the interface system the respective more than one optimal temporal path of the provided at least one journey outcome.

In a further example embodiment of the system the determined more than one temporal path to each at least one journey outcome are those temporal paths having a calculated value that is above a specified threshold. The calculated value may further comprise a probability of success or a confidence value of those temporal paths associated with the at least one journey outcome. In some example embodiments, the processing system is further configured to provide the interface system with the respective probability of success values or the confidence value associated with the provided at least one journey outcome.

In a further example embodiment of the system the processing system is further configured to provide the interface system with respective salary information associated with the provided at least one journey outcome.

In a further example embodiment of the system the processing system is further configured to store the trained temporal neural network on the at least one memory, determine, using the temporal path neural network, that the at least one memory contains a respective user profile of at least one further user having a respective further temporal path that matches one of the optimal temporal paths of the user, and provide to the interface system respective identification information of at least one of the further users. In some example embodiments the processing system is further configured to determine that the respective further temporal path is more sequentially advanced in the temporal path neural network, for the providing of the respective identification information. In another example embodiment wherein the processing system is further configured to provide to the interface system the respective further temporal path of the at least one of the further users.

In a further example embodiment of the system the processing system is further configured to store the trained temporal neural network on the at least one memory, determine, using the temporal path neural network, that the at least one memory contains a respective user profile of at least one further user having a respective further optimal temporal path that matches the optimal temporal path of the user; and provide to the interface system respective identification information of at least one of the further users.

In a further example embodiment of the system at least one of the journey outcomes is a career, and at least one of the network layers corresponds to academic program information.

In a further example embodiment of the system the processing system is further configured to determine the respective optimal temporal path based on a probability of success or a confidence value.

In a further example embodiment of the system the processing system is further configured to determine the respective optimal temporal path based on predicted salary, predicted demand cost, duration, or scholarship information.

In a further example embodiment of the system the external data comprises: career salary information, personality information, career demand information, career trend information, credential information or alumni information.

In a further example embodiment of the system the at least one user temporal event from the received personal data which corresponds to at least one of the network layers comprises: high school grades, post-secondary grades, post-secondary program entry, post-secondary course selection, credentials, equivalence testing or job attainment.

In a further example embodiment of the system further comprises storing external data in the at least one memory which comprises the processing system executing computer code to provide to the interface system queries for information to at least one external database, monitor the interface system for responses to the queries from the at least one external database, store in the at least one memory the responses to the queries from the at least one external database.

In a further example embodiment of the system the additional data includes at least one additional user temporal event of the user representing an actual outcome and the processing system is further configured to re-train the temporal path neural network with the at least one user temporal event and the at least one additional user temporal event. In a further example embodiment, the processing system is further configured to compare the actual outcome from the additional data with an expected outcome determined from the respective optimal path; and the re-training comprises re-training the temporal path neural network based on the comparing.

In a further example embodiment of the system the additional data is further external data and the processing system is further configured to re-train the temporal path neural network with the further external data.

In a further example embodiment of the system the at least one journey outcome having the determined respective optimal temporal path is an optimal journey outcome; and wherein the providing comprises providing the optimal journey outcome and the respective optimal temporal path of the optimal journey outcome. In a further embodiment, the optimal journey outcome is based on a predicted salary, predicted demand cost, duration, or scholarship information.

In a further example embodiment of the system the temporal path neural network is trained using a decision tree, a batch, a classification tree, or a regression tree, a conditional inference tree or an ensemble method. In a further embodiment, the temporal path neural network is further trained using one of random forests or chi-square.

In a further example embodiment of the system the temporal path neural network determines a respective optimal temporal path within the temporal path neural network to at least one journey outcome for the user which corresponds to at least one of the network layers using a correlation coefficient, log-likelihood probability, or an r value.

In a further example embodiment of the system the at least one memory comprises a data lake, wherein the processing system is further configured to store the received external data to the data lake, wherein the training of the temporal path neural network includes accessing the stored received external data from the data lake.

In a further example embodiment of the system the re-determining further comprises: automatically optimizing the temporal path based on forward-propagated and backward-propagated learned or new data ingress or egress through the interface system.

In a further example embodiment of the system the re-determining further comprises: receiving additional personal data of the user and storing the additional personal data in the at least one memory for the processing system to use the temporal path neural network to learn, recommend, or augment the at least one optimal temporal paths.

One example embodiment is a computer program product by a computer-implemented process for decision modelling of a personal temporal path, the computer program product comprising instructions stored in a non-transitory computer readable medium which, when executed by a computer, causes the computer to define more than one network layers of a temporal path neural network, at least two of the network layers representing different temporal events at different times in a personal temporal path. The computer may then receive external data from an interface system, the external data including at least one economic temporal event which corresponds to at least one of the network layers and train the temporal path neural network with the received external data. The computer further receives personal data of a user from the interface system that includes at least one user temporal event which corresponds to at least one of the network layers and determines a respective optimal temporal path within the temporal path neural network to at least one journey outcome for the user which corresponds to at least one of the network layers, from the at least one user temporal event which corresponds to at least one of the network layers. The computer then provides to the interface system at least one of the journey outcomes, the respective optimal temporal path, and information based on probabilistic attributes of the respective optimal temporal path. The computer can also receive additional data from the interface system which corresponds to at least one of the network layers, then re-determine a respective optimal temporal path within the temporal path neural network to at least one journey outcome for the user which corresponds to at least one of the network layers, using at least the additional data; and provide to the interface system at least one of the journey outcomes from the re-determining, and the respective optimal temporal path from the re-determining, and information based on probabilistic attributes of the respective optimal temporal path from the re-determining.

One example embodiment is a system for decision modelling of a personal temporal path, comprising an interface system for receiving external data, at least one memory, and a processing system. The processing system is in communication with the interface system and the at least one memory, and configured to execute computer code stored on the at least one memory to receive the external data from the interface system, train a machine learning system with the received external data, and receive personal data of a user from the interface system that includes at least one user temporal event comprising academic program information. The system also determines, using the trained machine learning system, a respective optimal temporal path to at least one career journey outcome for the user from the at least one user temporal event comprising the academic program information, and provides to the interface system at least one of the career journey outcomes and the respective optimal temporal path and information based on probabilistic attributes of the respective optimal temporal path. When the system receives additional data from the interface system, it re-determines a respective optimal temporal path to the at least one career journey outcome for the user, using at least the additional data; and provides to the interface system the at least one career journey outcome from the re-determining, and the respective optimal temporal path from the re-determining, and information based on probabilistic attributes of the respective optimal temporal path from the re-determining.

One example embodiment is a system for decision modelling of a personal temporal path, comprising an interface system for receiving external data, at least one memory, and a processing system. The processing system is in communication with the interface system and the at least one memory, configured to execute computer code stored on the at least one memory to receive the external data from the interface system that includes at least one economic temporal event, train a machine learning system with the received external data. When the system receives personal data of a user from the interface system that includes at least one user temporal event comprising academic program information, and a request that includes an identification of a career journey outcome that is desired for the user, the system determines, using the trained machine learning system, a respective optimal temporal path to the identified career journey outcome and provides to the interface system the identified career journey outcome and the respective optimal temporal path and information based on probabilistic attributes of the respective optimal temporal path. The system may receive additional data from the interface system, re-determine a respective optimal temporal path to the identified career journey outcome for the user, using at least the additional data, and provide to the interface system the identified career journey outcome from the re-determining, and the respective optimal temporal path from the re-determining, and information based on probabilistic attributes of the respective optimal temporal path from the re-determining.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprises of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:
1. A system for decision modelling of a personal temporal path, comprising:
   an interface system for receiving external data;
   at least one memory; and
   a processing system in communication with the interface system and the at least one memory, configured to execute computer code stored on the at least one memory to:
      define more than one network layers of a temporal path neural network, at least two of the network layers representing different temporal events at different times in the personal temporal path, wherein respective weights between the at least two of the network layers represent temporal paths;
      receive the external data from the interface system that includes at least one economic temporal event which corresponds to at least one of the network layers;
      train the temporal path neural network with the received external data;

receive personal data of a user from the interface system that includes at least one user temporal event which corresponds to at least one of the network layers;

determine a respective optimal temporal path within the temporal path neural network to at least one journey outcome for the user which corresponds to at least one of the network layers, from the at least one user temporal event which corresponds to at least one of the network layers;

provide to the interface system at least one of the journey outcomes, the respective optimal temporal path, and information based on probabilistic attributes of the respective optimal temporal path;

receive additional data from the interface system which corresponds to at least one of the network layers;

re-determine a respective optimal temporal path within the temporal path neural network to at least one journey outcome for the user which corresponds to at least one of the network layers, using at least the additional data;

provide to the interface system at least one of the journey outcomes from the re-determining, and the respective optimal temporal path from the re-determining, and information based on probabilistic attributes of the respective optimal temporal path from the re-determining; and wherein the more than one network layers of the temporal path neural network defined by the processing system are in a chronological order in a feed forward direction of the temporal path neural network.

2. The system of claim 1, wherein the determining comprises determining the respective optimal temporal path within the temporal path neural network to a plurality of journey outcomes for the user.

3. The system of claim 1, wherein the processing system is further configured to receive a request that includes an identification of at least one journey outcome that is desired for the user, wherein the providing comprises providing the respective optimal temporal path of the identified one journey outcome that is desired for the user.

4. The system of claim 1, wherein the received personal data includes non-temporal user information, wherein at least one network layer of the temporal path neural network represents the non-temporal user information.

5. The system of claim 4, wherein the non-temporal user information comprises personality information of the user.

6. The system of claim 1, wherein the temporal path neural network comprises hidden layers.

7. The system of claim 1, wherein the additional data is additional personal data of the user that includes an additional user temporal event which corresponds to at least one of the network layers.

8. The system of claim 1, wherein the processing system is further configured to:

determine using the temporal path neural network more than one of the temporal paths to each at least one journey outcome which are above a specified threshold, wherein said providing comprises providing to the interface system the respective more than one of the temporal paths of the provided at least one journey outcome.

9. The system of claim 1, wherein the respective temporal paths to each at least one journey outcome are those of the temporal paths having a calculated value that is above a specified threshold.

10. The system of claim 9, wherein the calculated value comprises a probability of success or a confidence value of those of the temporal paths associated with each at least one journey outcome.

11. The system of claim 10, wherein the processing system is further configured to provide the interface system with the respective probability of success values or the confidence value associated with the provided at least one journey outcome.

12. The system of claim 1, wherein the processing system is further configured to provide the interface system with respective salary information associated with the provided at least one journey outcome.

13. The system of claim 1, wherein the processing system is further configured to:

store the trained temporal path neural network on the at least one memory;

determine, using the temporal path neural network, that the at least one memory contains a respective user profile of at least one further user having a respective further temporal path that matches one of the optimal temporal paths of the user, and provide to the interface system respective identification information of at least one of the further users.

14. The system of claim 13, wherein the processing system is further configured to determine that the respective further temporal path is more chronologically advanced in the temporal path neural network, for the providing of the respective identification information.

15. The system of claim 13, wherein the processing system is further configured to provide to the interface system the respective further temporal path of the at least one of the further users.

16. The system of claim 1, wherein the processing system is further configured to:

store the trained temporal neural network on the at least one memory;

determine, using the temporal path neural network, that the at least one memory contains a respective user profile of at least one further user having a respective further optimal temporal path that matches the optimal temporal path of the user; and provide to the interface system respective identification information of at least one of the further users.

17. The system of claim 1, wherein at least one of the journey outcomes is a career, and wherein at least one of the network layers corresponds to academic program information.

18. The system of claim 1, wherein the processing system is further configured to determine the respective optimal temporal path based on a probability of success or a confidence value.

19. The system of claim 1, wherein the processing system is further configured to determine the respective optimal temporal path based on predicted salary, predicted demand cost, duration, or scholarship information.

20. The system of claim 1, wherein the external data comprises: career salary information, personality information, career demand information, career trend information, credential information or alumni information.

21. The system of claim 1, wherein the at least one user temporal event from the received personal data which corresponds to at least one of the network layers comprises: high school grades, post-secondary grades, post-secondary program entry, post-secondary course selection, credentials, equivalence testing or job attainment.

22. The system of claim 1, wherein said storing in the at least one memory external data comprises the processing system executing computer code to:
provide to the interface system queries for information to at least one external database;
monitor the interface system for responses to the queries from the at least one external database;
store in the at least one memory the responses to the queries from the at least one external database.

23. The system of claim 1, wherein the additional data includes at least one additional user temporal event of the user representing an actual outcome;
wherein the processing system is further configured to re-train the temporal path neural network with the at least one user temporal event and the at least one additional user temporal event.

24. The system of claim 23, wherein the processing system is further configured to:
compare the actual outcome from the additional data with an expected outcome determined from the respective optimal path; and
wherein said re-training comprises re-training the temporal path neural network based on the comparing.

25. The system of claim 1, wherein the additional data is further external data;
wherein the processing system is further configured to re-train the temporal path neural network with the further external data.

26. The system of claim 1, wherein the at least one journey outcome having the determined respective optimal temporal path is an optimal journey outcome; and wherein the providing comprises providing the optimal journey outcome and the respective optimal temporal path of the optimal journey outcome.

27. The system of claim 26, wherein the optimal journey outcome is based on a predicted salary, predicted demand cost, duration, or scholarship information.

28. The system of claim 1, wherein the temporal path neural network is trained using a decision tree, a batch, a classification tree, or a regression tree, a conditional inference tree or an ensemble method.

29. The system of claim 28, wherein the temporal path neural network is further trained using one of random forests or chi-square.

30. The system of claim 1, wherein the temporal path neural network determines a respective optimal temporal path within the temporal path neural network to at least one journey outcome for the user which corresponds to at least one of the network layers using a correlation coefficient, log-likelihood probability, or an r value.

31. The system of claim 1, wherein the at least one memory comprises a data lake, wherein the processing system is further configured to store the received external data to the data lake, wherein the training of the temporal path neural network includes accessing the stored received external data from the data lake.

32. The system of claim 1, wherein the re-determining further comprises:
automatically optimizing the temporal path based on forward-propagated and backward-propagated learned or new data ingress or egress through the interface system.

33. The system of claim 1, wherein the re-determining further comprises:
receiving additional personal data of the user and storing the additional personal data in the at least one memory for the processing system to use the temporal path neural network to learn, recommend, or augment the at least one optimal temporal paths.

34. The system of claim 1, wherein all of the respective weights between the network layers represent the temporal paths.

35. The system of claim 1, wherein at least one in-between network layer of the network layers of the temporal path neural network is an input layer.

36. The system of claim 1, wherein at least one in-between network layer of the network layers of the temporal path neural network is an output layer.

37. A computer program product by a computer-implemented process for decision modelling of a personal temporal path, the computer program product comprising instructions stored in a non-transitory computer readable medium which, when executed by a computer, causes the computer to:
define more than one network layers of a temporal path neural network, at least two of the network layers representing different temporal events at different times in a personal temporal path, wherein respective weights between the at least two of the network layers represent temporal paths;
receive external data from an interface system, the external data including at least one economic temporal event which corresponds to at least one of the network layers;
train the temporal path neural network with the received external data;
receive personal data of a user from the interface system that includes at least one user temporal event which corresponds to at least one of the network layers;
determine a respective optimal temporal path within the temporal path neural network to at least one journey outcome for the user which corresponds to at least one of the network layers, from the at least one user temporal event which corresponds to at least one of the network layers;
provide to the interface system at least one of the journey outcomes, the respective optimal temporal path, and information based on probabilistic attributes of the respective optimal temporal path;
receive additional data from the interface system which corresponds to at least one of the network layers;
re-determine a respective optimal temporal path within the temporal path neural network to at least one journey outcome for the user which corresponds to at least one of the network layers, using at least the additional data;
provide to the interface system at least one of the journey outcomes from the re-determining, and the respective optimal temporal path from the re-determining, and information based on probabilistic attributes of the respective optimal temporal path from the re-determining; and
wherein the more than one network layers of the temporal path neural network defined by the processing system are in a chronological order in a feed forward direction of the temporal path neural network.

38. A system for decision modelling of a personal temporal path, comprising:
an interface system for receiving external data;
at least one memory; and
a processing system in communication with the interface system and the at least one memory, configured to execute computer code stored on the at least one memory to:

receive the external data from the interface system;
train a machine learning system with the received external data;
receive personal data of a user from the interface system that includes at least one user temporal event comprising academic program information, wherein respective weights between the at least one user temporal event comprising academic program information represent temporal paths;
determine, using the trained machine learning system, a respective optimal temporal path to at least one career journey outcome for the user from the at least one user temporal event comprising the academic program information;
provide to the interface system at least one of the career journey outcomes and the respective optimal temporal path and information based on probabilistic attributes of the respective optimal temporal path;
receive additional data from the interface system;
re-determine a respective optimal temporal path to the at least one career journey outcome for the user, using at least the additional data;
provide to the interface system the at least one career journey outcome from the re-determining, and the respective optimal temporal path from the re-determining, and information based on probabilistic attributes of the respective optimal temporal path from the re-determining; and
wherein the at least one user temporal event comprising academic program information received by the processing system are in a chronological order in a feed forward direction of the trained machine learning system.

39. A system for decision modelling of a personal temporal path, comprising:
an interface system for receiving external data;
at least one memory; and
a processing system in communication with the interface system and the at least one memory, configured to execute computer code stored on the at least one memory to:
receive the external data from the interface system that includes at least one economic temporal event;
train a machine learning system with the received external data;
receive personal data of a user from the interface system that includes at least one user temporal event comprising academic program information, wherein respective weights between the at least one user temporal event comprising academic program information and the at least one economic temporal event represent temporal paths;
receive a request that includes an identification of a career journey outcome that is desired for the user;
determine, using the trained machine learning system, a respective optimal temporal path to the identified career journey outcome;
provide to the interface system the identified career journey outcome and the respective optimal temporal path and information based on probabilistic attributes of the respective optimal temporal path;
receive additional data from the interface system;
re-determine a respective optimal temporal path to the identified career journey outcome for the user, using at least the additional data;
provide to the interface system the identified career journey outcome from the re-determining, and the respective optimal temporal path from the re-determining, and information based on probabilistic attributes of the respective optimal temporal path from the re-determining; and
wherein the at least one economic temporal event and the at least one user temporal event comprising academic program information received by the processing system are in a chronological order in a feed forward direction of the temporal path neural network.

* * * * *